United States Patent [19]

Oosawa

[11] Patent Number: 5,943,651
[45] Date of Patent: Aug. 24, 1999

[54] AUTOMATIC AIRLINE TICKET ISSUER AND ENTRY CARD CREATING SYSTEM

[75] Inventor: Satoru Oosawa, Maebashi, Japan

[73] Assignee: Fujitsu Limited, Kawasaki, Japan

[21] Appl. No.: 08/875,141

[22] PCT Filed: Nov. 28, 1996

[86] PCT No.: PCT/JP96/03491

§ 371 Date: Jul. 18, 1997

§ 102(e) Date: Jul. 18, 1997

[87] PCT Pub. No.: WO97/20289

PCT Pub. Date: Jun. 5, 1997

[30] Foreign Application Priority Data

Nov. 28, 1995 [JP] Japan .................................. 7-309018

[51] Int. Cl.[6] .................................................. G05F 17/60
[52] U.S. Cl. ................ 705/5; 705/13; 235/384; 283/23; 283/28; 283/29; 283/32
[58] Field of Search ......................... 705/5, 13; 235/384; 283/23–33

[56] References Cited

U.S. PATENT DOCUMENTS 5,832,451 11/1998 Flake et al. ................................ 705/5

FOREIGN PATENT DOCUMENTS

| | | |
|---|---|---|
| 55-155734 | 2/1980 | Japan . |
| 59-87587 | 5/1984 | Japan . |
| 62-67689 | 3/1987 | Japan . |
| 63-156279 | 6/1988 | Japan . |
| 3-171255 | 7/1991 | Japan . |

*Primary Examiner*—Eric W. Stamber
*Assistant Examiner*—Akiba Robinson-Boyce
*Attorney, Agent, or Firm*—Staas & Halsey

[57] ABSTRACT

An airline ticket issuing apparatus connected via a communications line to a seat reservation system is installed in a travel agency and so on. This airline ticket issuing apparatus records, on an airline ticket, boarding information and entry card information that are inputted by a person in charge. The airline ticket is divided into a coupon to be collected by the person in charge of an airline at a boarding gate in an airport, and a passenger ticket to be returned to a passenger thereat. A magnetic stripe is formed extending over the coupon and the passenger ticket orthogonally to a perforated line on the underside of the air ticket. The airline ticket issuing apparatus records dummy data on an area, peripheral to the perforated line, of the magnetic stripe, records the boarding information on an area, on the side of the coupon, of the magnetic stripe, and records entry card information on an area, on the side of the passenger ticket, of the magnetic stripe. An automatic entry card creating apparatus is installed in an airplane. The automatic entry card creating apparatus reads the entry card information from the passenger ticket brought into the airplane by a passenger, and prints necessary items of information on the entry card based on the entry card information.

8 Claims, 18 Drawing Sheets

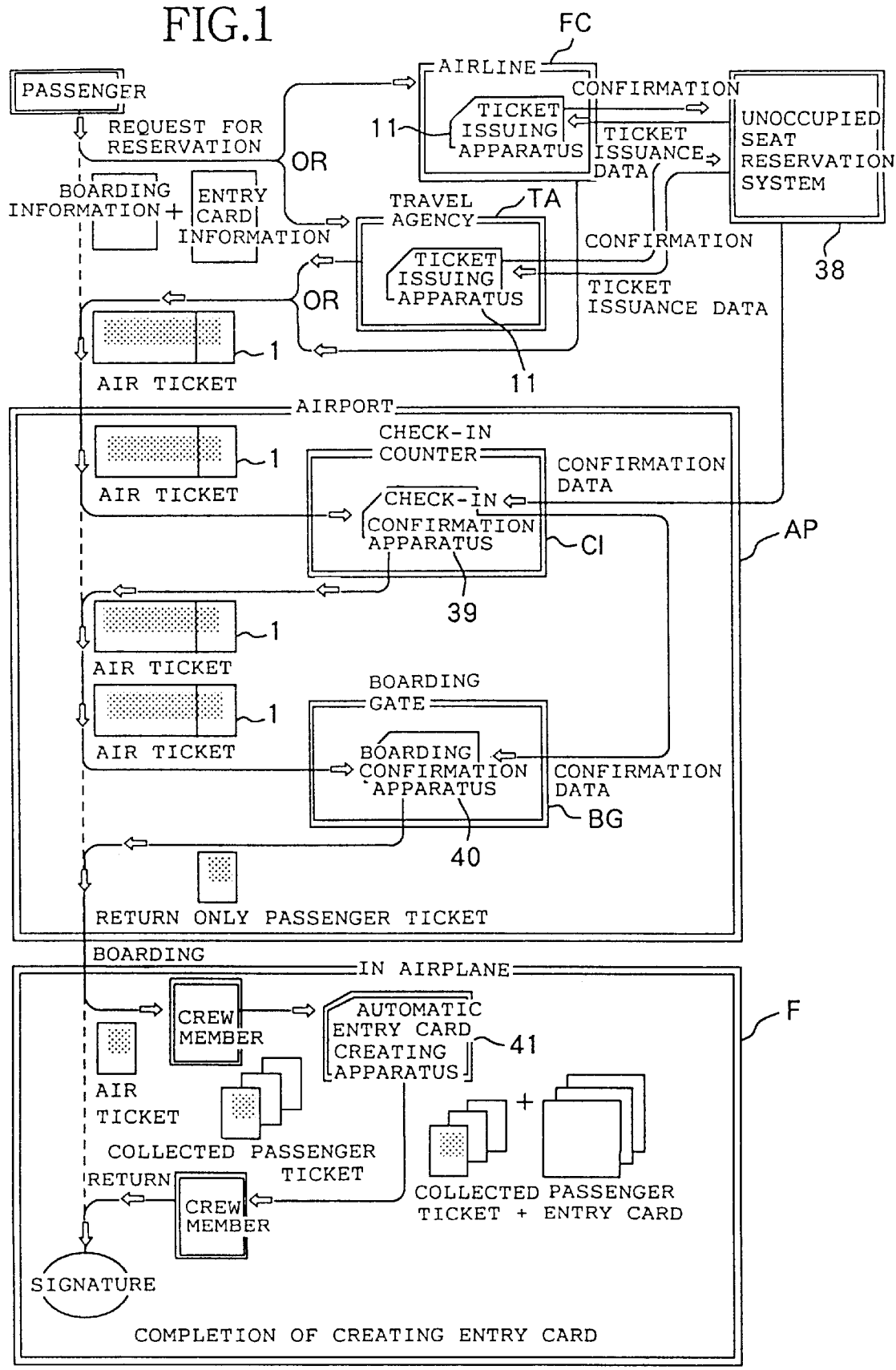

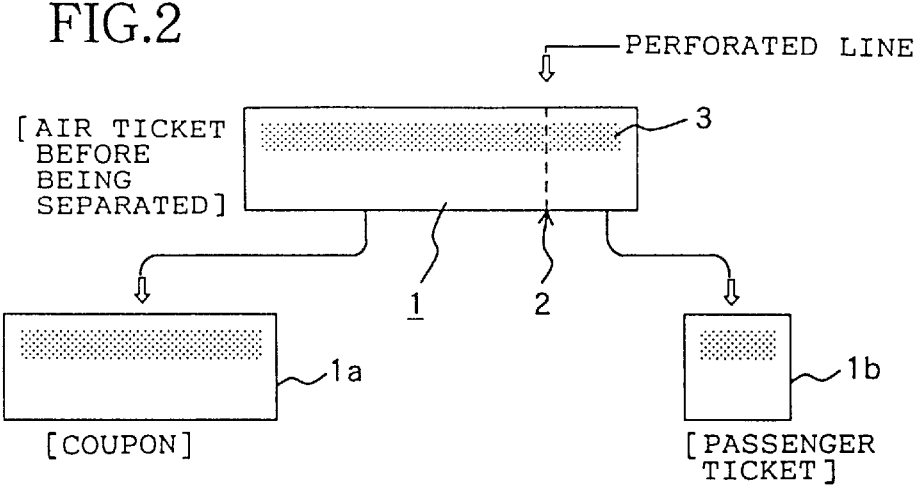
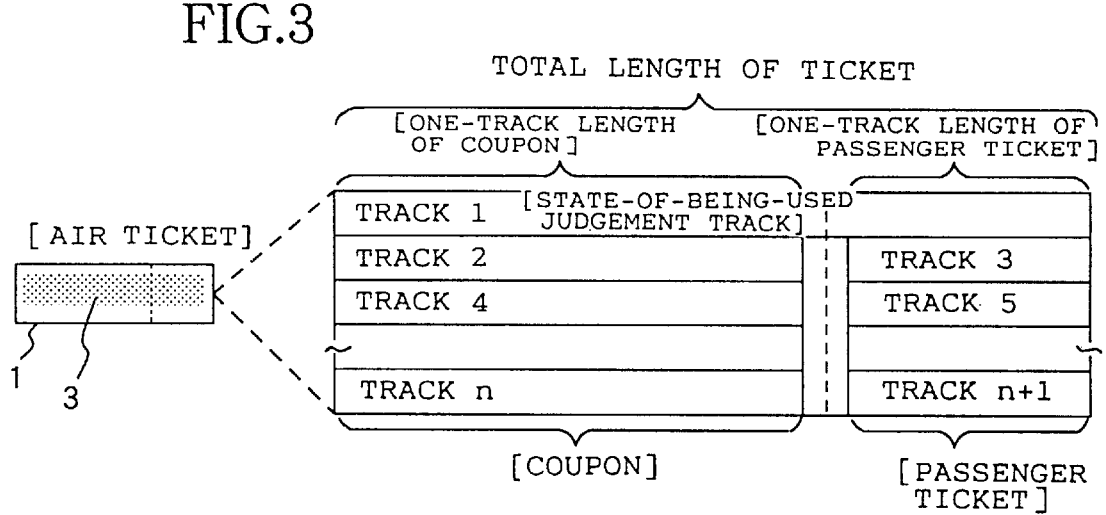

FIG.4

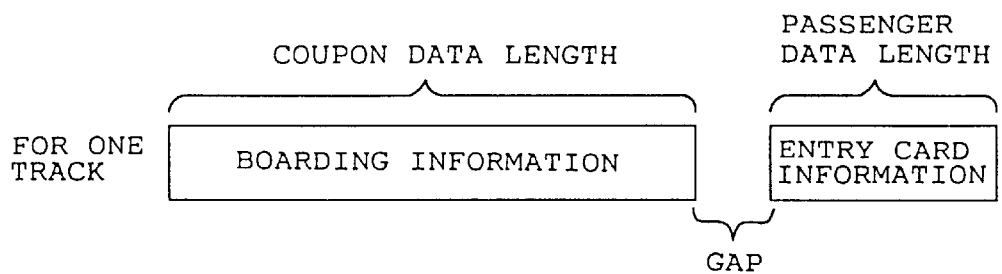

FIG.5

| BOARDING INFORMATION | NAME OF AIRLINE, FLIGHT NUMBER, NAME OF DEPARTURE AIRPORT, NAME OF ARRIVAL AIRPORT, VIA-LAND, FARE, NAME OF PASSENGER, SEAT NUMBER, CLASS OF SEAT, FEATURE OF SEAT, BOARDING DATE, BOARDING TIME |
|---|---|
| ENTRY CARD INFORMATION | NAME OF ENTRY PERSON, AGE, SEX, OCCUPATION, NATIONALITY, PASSPORT NUMBER, PURPOSE OF ENTRANCE, PLACE OF STAY, DAYS OF STAY, ADDRESS DURING STAY |

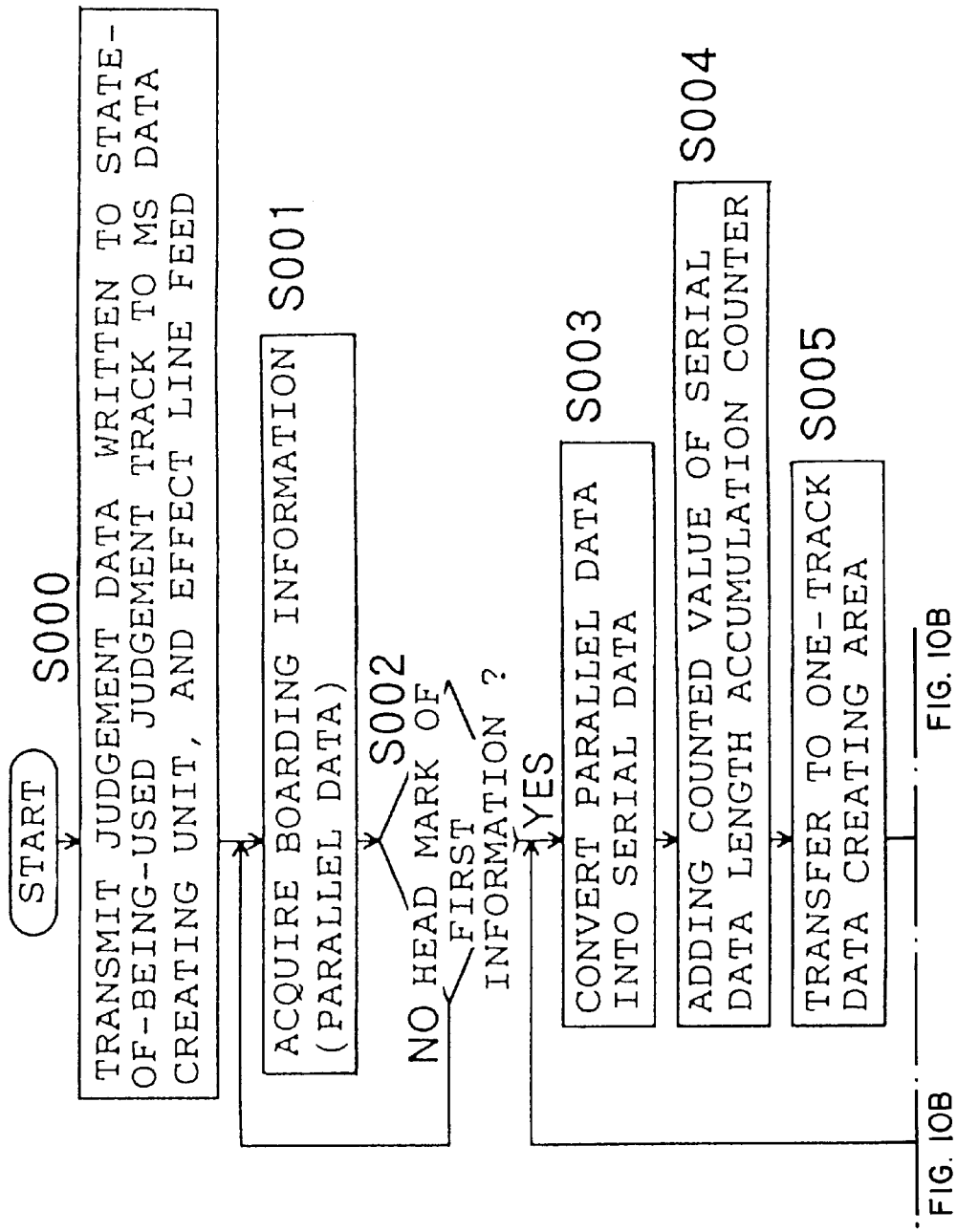

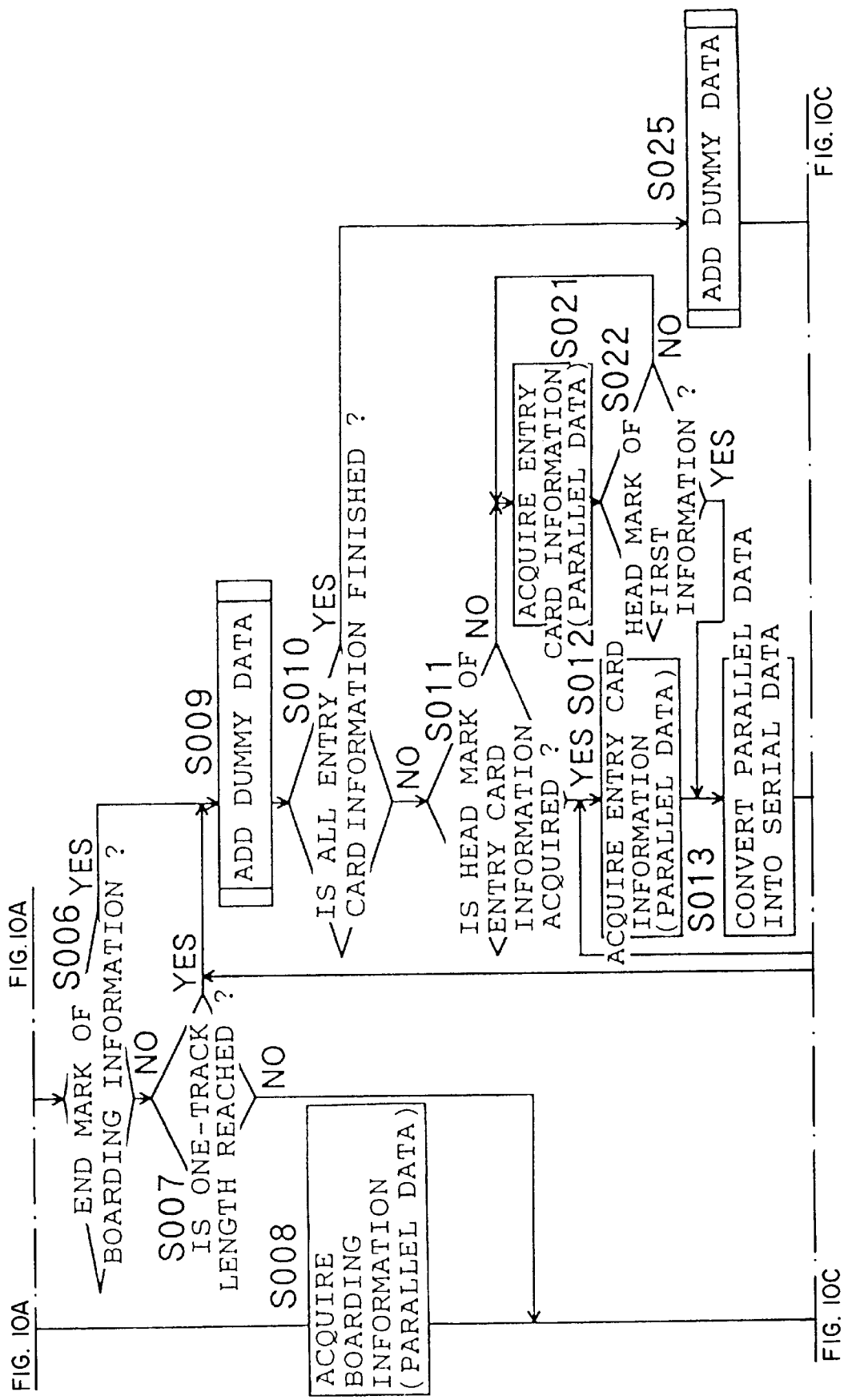

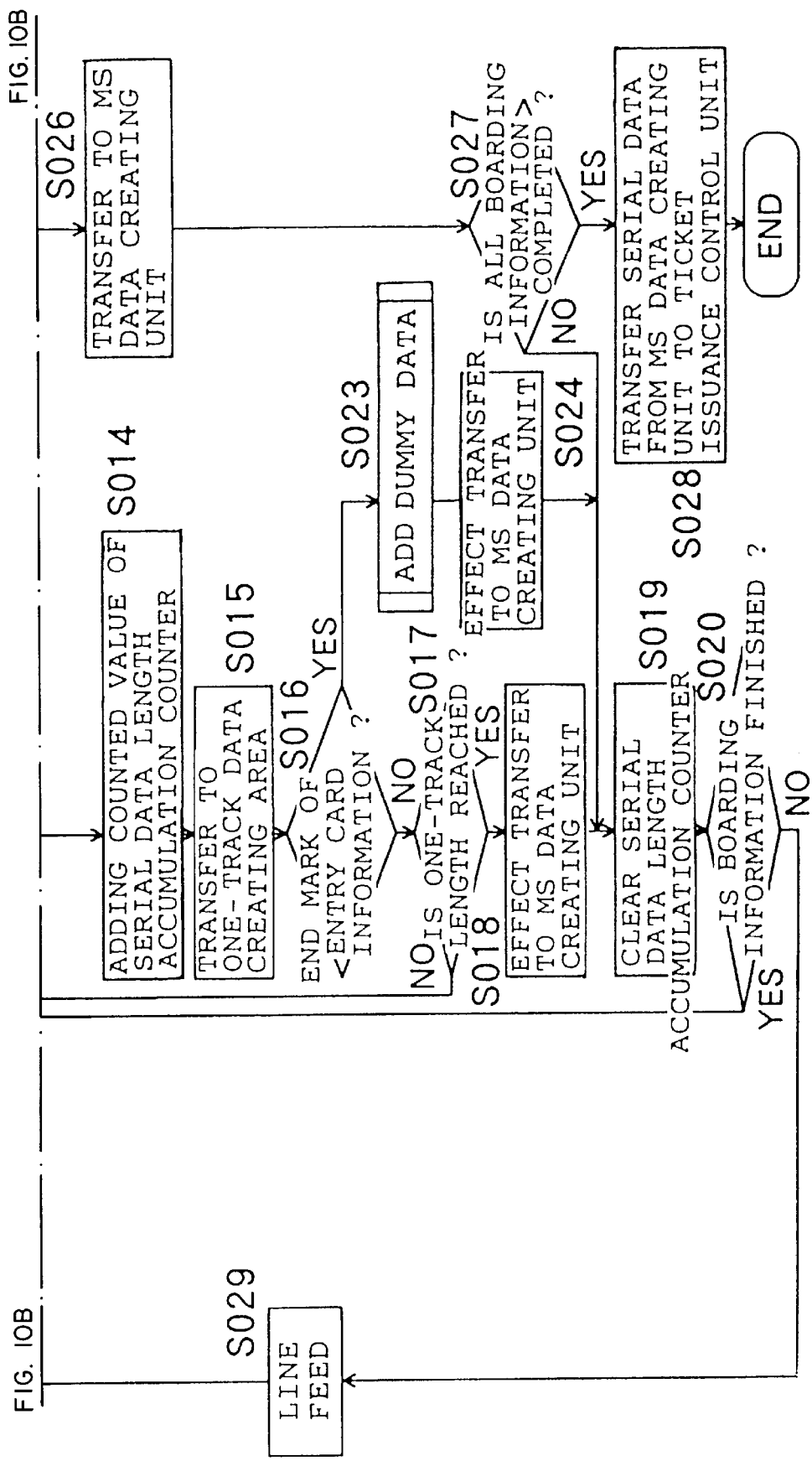

AUTOMATIC AIRLINE TICKET ISSUER AND ENTRY CARD CREATING SYSTEM

TECHNICAL FIELD

The present invention relates to an automatic entry card creating system using an airline ticket including a magnetic stripe on which information can be written, an airline ticket issuing apparatus, an automatic entry card creating apparatus, and an airline ticket.

BACKGROUND ARTS

An airline ticket(automated ticket and boarding pass)1 which has hitherto been used, is separated along a perforated line 2 as shown in FIG. 19 into a coupon 1a collected by an airline at a boarding gate of an airplane, and a boarding pass 1b handed over to a passenger. Then, all or some items of boarding information about a name of airline, a flight number, a name of departure airport, a name of arrival airport, a via-destination, a fare, a name of passenger, a seat number, a class of seat and a feature of seat, are visually printed on the front surfaces of the coupon 1a and the boarding pass 1b. On the other hand, a continuous magnetic stripe 3 is so formed on the underside (a surface shown in FIG. 19) of the airline ticket as to extend over the coupon 1a and the boarding pass 1b. This magnetic stripe 3 is, as illustrated in FIG. 20, divided into n-lines of tracks in a direction orthogonal to a dotted line 2. The boarding information is all recorded on the respective tracks. On a first track, however, there is written a predetermined item of information which makes sense only when the information is read from a head (on the side of the coupon) to a terminal (on the side of the passenger ticket) of the first track, and the first track is used for judging whether or not the airline ticket has been used. Note that the information thus recorded on the magnetic stripe 3 or signal-form information recordable on the magnetic stripe 3 is hereinafter referred to as "MS data".

In a seat management system using such an airline ticket 1, a passenger at first submits a reservation form in which the boarding information is written to a branch office of the airline or a travel agency, and makes a request for reserving the airline ticket. Then, a person in charge (an operator) in the branch office of the airline or the travel agency inputs the information written in the reservation form by use of an airline ticket issuing apparatus, and communicates with the seat reservation system in the head office of the airline via a communications line, thus executing a process of confirming the reservation of the ticket. Then, the air ticket issuing apparatus, when the reservation is confirmed, issues the airline ticket 1 on the basis of ticket issue data which the seat reservation system notifies. At this time, the MS data are recorded on the air ticket 1 the above-described boarding information is visually printed thereon.

When it becomes predetermined time before a boading time, the passenger submits the airline ticket 1 to a check-in counter of the airline in the airport. A person in charge at the check-in counter reads the boarding information from the magnetic stripe 3 on this airline ticket 1 by using a check-in confirmation apparatus, thus confirming the reservation to the seat reservation system. Then, when finally confirmed, the person in charge returns the airline ticket 1 to the passenger.

When it becomes the boading time, the passenger hands over the airline ticket 1 to the person in charge of the airline at a boarding gate. The person in charge at the boarding gate inserts this airline ticket 1 into a boarding confirmation apparatus. The boarding confirmation apparatus reads the boarding information from the magnetic stripe, and collates it with the boarding information (the data for confirmation) read by the check-in confirmation apparatus, thereby making a boarding confirmation. Then, when the boarding confirmation is completed, the person in charge cuts away the airline ticket 1 along a perforated line 2, and hands over the passenger ticket 1b to the passenger while collecting the coupon 1a. When the airline ticket 1 is thus cut away, it follows that the respective tracks of the magnetic stripe 3 are disconnected halfway. Hence, even if the passenger ticket 1b is reinserted into the boarding confirmation apparatus, the boarding information can not be read any more. Accordingly, it is prevented such a problem that the same boarding information is compared double with the confirmation data, which might be recognized as double booking. The passenger boards on the airplane with this passenger ticket 1b and sits on the seat identical with the seat number printed on the passenger ticket 1b.

On the other hand, nowadays, in a great majority of countries, it is compulsory that a foreigner should submit an entry card when entering the country. A sheet of this entry card is distributed by a crew member in the airplane, and therefore the passenger must write necessary items on the sheet of the entry card in the airplane until the airplane arrives at the country, excluding such a case that the passenger prepares the entry card beforehand. In many cases, however, names of items to be filled in the entry card and a guide to fill are written on the entry card in English and an official language of that country, and the languages usable for filling the required items are limited to English and the official language of that country. Accordingly, the fill-in process on the entry card is troublesome to persons unable to understand those languages and unaccustomed to traveling abroad, and therefore a mistake in writing easily occurs. Further, it might often happen that the passenger takes out a passport by opening a store box above the head in order to confirm a passport number required to be written on the entry card by most of countries. This process is very troublesome as well as being rather dangerous when an air flow is unstable. Moreover, some persons who get sick or fall into sleep during the flight on the airplane might, even though proficient in those languages, feel it quite painful to fill in the entry card. For this reason, it has been desired to develop a system capable of automatically creating the entry card without the troublesome process of handwriting by the passenger.

A most prospective system in this concept involves the use of the MS data recorded on the magnetic stripe of the airline ticket 1. As described above, however, the MS data recorded on the magnetic stripe 3 of the conventional airline ticket 1 are only the information relative to the boarding but do not contain any information needed when creating the entry card. The magnetic stripe 3 formed on the airline ticket 1 is formatted so that the same track extends across the perforated line 2 over the coupon 1a and the passenger ticket 1b. Therefore, when the airline ticket 1 is cut away at the time of boarding, it follows that the MS data recorded on the magnetic stripe 3 are regarded as invalid data, and it is impossible to make the use of the MS data for creating the entry card in the airplane.

It is an object of the present invention to make an entry card creating information to be read from a passenger ticket 1b which had been separated from an airline ticket 1 by recording all items of the entry card creating information on the passenger ticket 1b of the air ticket 1 so that an entry card can be automatically created based on the read entry card creating information.

SUMMARY OF THE INVENTION

According to a first aspect of the present invention, an automatic entry card creating system deals with an airline ticket consisting of a coupon part and a passenger ticket part which are separable from each other, and on which a magnetic stripe is formed over the coupon part and the passenger ticket part. This system comprises an airline ticket issuing apparatus, to which entry card information composed of items of information to be written on an entry card is inputted, and which records all items of the inputted entry card information on the magnetic stripe of the passenger ticket part of the airline ticket, and issues the airline ticket. This system also comprises an automatic entry card creating apparatus which reads the entry card information from the magnetic strip of the passenger ticket part of the airline ticket separated from the airline ticket, and which automatically creates an entry card on the basis of the read entry card information.

According to the first aspect of the present invention, once a passenger submits a reservation form on which entry card information is written to reserve the airline ticket and, the airline ticket issuing apparatus records the entry card information on the magnetic stripe of the passenger ticket part. Accordingly, if the passenger hands over the passenger ticket part to a crew member at the time of boarding the airplane, the entry card is created simply without a troublesome process of writing the entry card information by the passenger himself or herself in the airplane. Therefore, the passenger can enjoy more comfortable and relaxed air travel.

According to a second aspect of the present invention, the airline ticket issuing apparatus includes an inputting device for inputting the entry card information and the boarding information, and a recording device for recording all items of the boarding information on the magnetic stripe of the coupon part of the air ticket, and for recording all items of the entry card information on the magnetic stripe of the passenger ticket part.

According to a third aspect of the present invention, the recording device records dummy data on an area, peripheral to a boundary line between the coupon part and the passenger ticket part, of the magnetic stripe, records the boarding information on an area, closer to the coupon part than the dummy data, of the magnetic stripe, and records the entry card information on an area, closer to the passenger ticket part than the dummy data, of the magnetic stripe.

According to a fourth aspect of the present invention, the automatic entry card creating apparatus includes a reading device for reading the entry card information from the magnetic stripe of the passenger ticket part separated from the airline ticket, a print data editing unit for editing print data on the basis of the entry card information read by the reading device, and a printing device for printing necessary items of information on the entry card on the basis of the print data edited by the print data editing unit.

According to a fifth aspect of the present invention, an airline ticket issuing apparatus issues an airline ticket consisting of a coupon part and a passenger ticket part which are separable from each other, and on which a magnetic stripe is formed over the coupon part and the passenger ticket part. The airline ticket issuing apparatus comprises an inputting device for inputting entry card information composed of items of information to be written on an entry card, and boarding information composed of items of information for specifying a content of reservation of the airline ticket. This apparatus also comprises a magnetic data editing device for editing magnetic data to be recorded on the magnetic stripe on the basis of the boarding information and the entry card information that have been input, and a magnetic data recording device for recording all items of the magnetic data of the boarding information on the magnetic stripe of the coupon part of the airline ticket, and for recording all items of the magnetic data of the entry card information on the magnetic stripe of the passenger ticket part. Accordingly, the entry card can be automatically created in, e.g., the airplane on the basis of the magnetic data of the entry card information recorded on the magnetic stripe of the air ticket issued by this air ticket issuing apparatus.

According to a sixth aspect of the present invention, the magnetic date recording device, when recording the magnetic data, records dummy data on an area, peripheral to a boundary line between the coupon part and the passenger ticket part, of the magnetic stripe, records the magnetic data of the boarding information on an area, closer to the coupon part than the dummy data, of the magnetic stripe, and records the magnetic data of the entry card information on an area, closer to the passenger ticket part than the dummy data, of the magnetic stripe. Therefore, the entry card is automatically created based on the magnetic data of the entry card information recorded on the magnetic stripe of the passenger ticket after being separated from the air ticket.

According to a seventh aspect of the present invention, an automatic entry card creating apparatus that prints necessary items of information on an entry card, and comprises a reading device for reading entry card information composed of items of information to be written on the entry card from a magnetic stripe of a passenger ticket part of an airline ticket consisting of a coupon part and the passenger ticket part which are separable from each other, and on which the magnetic stripe is formed over the coupon part and the passenger ticket part. This apparatus also comprises a print data editing unit for editing print data on the basis of the entry card information read by the reading device, and a printing device for printing necessary items of information on the entry card on the basis of the print data edited by the print data editing unit. Accordingly, the entry card can be automatically created based on the entry card information recorded on the magnetic stripe of the passenger ticket. Consequently, the passenger may only hand over the passenger ticket to the crew member, and there is no necessity for a troublesome process of filling in the entry card as previously required.

According to an eighth aspect of the present invention, an airline ticket comprises a coupon part and a passenger ticket part. The coupon part and the passenger ticket part are separable from each other, with a magnetic stripe formed over the coupon part and the passenger ticket part. Dummy data is recorded on an area, peripheral to a boundary line between the coupon part and the passenger ticket part, of the magnetic stripe. Boarding information composed of items of information for specifying a content of reservation of the airline ticket, is recorded on an area, closer to the coupon part than the dummy data, of the magnetic stripe. Entry card nformation composed of items of information to be written on an entry card, is recorded on an area, closer to the passenger ticket part than the dummy data, of the magnetic stripe. Hence, the entry card can be automatically created by using this airline ticket and without effecting troublesome operations in the airplane.

BRIEF DESCRIPTION OF THE DRAWINGS

FIG. 1 is a diagram showing a construction of an entry card automatic creating system in an embodiment of the present invention;

FIG. 2 is a plan view showing a configuration of an airline ticket shown in FIG. 1;

FIG. 3 is an explanatory diagram showing a format of a magnetic stripe shown in FIG. 2;

FIG. 4 is a diagram showing a structure of data recorded on an n-th track and on an (n+1)-th track;

FIG. 5 is a table showing specific contents of boarding information and entry card information;

FIG. 10 is a flowchart showing an MS data editing module in a ticket editing and issuing program executed by an MPU shown in FIG. 7;

BEST MODE FOR CARRYING OUT THE INVENTION

Figure 6:
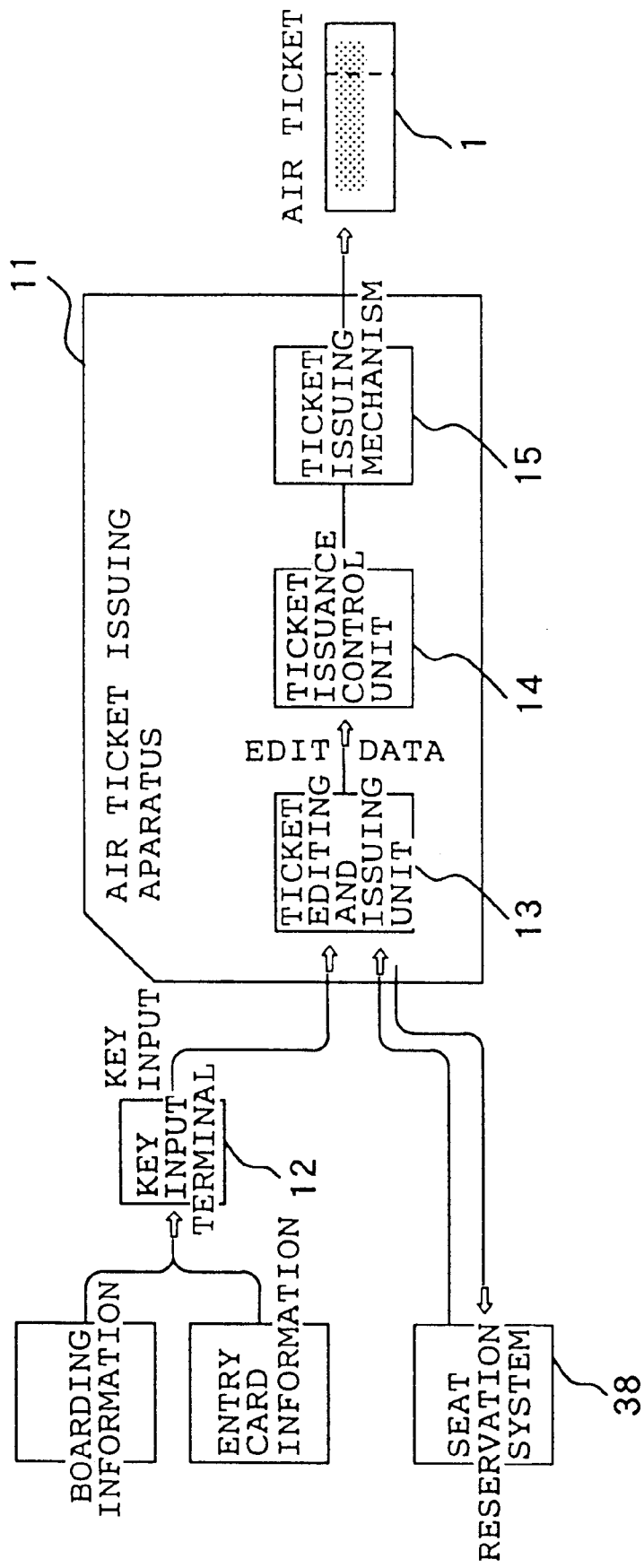
FIG. 6 is a block diagram showing an outline of a construction of an airline ticket issuing apparatus shown in FIG. 1.

A best mode for carrying out the present invention will hereinafter be described with reference to the drawings.

(1) Outline of Automatic entry card creating System

FIG. 1 is a system construction diagram illustrating an automatic entry card creating system by way of a best mode for carrying out the present invention.

As shown in FIG. 1, the present system comprises an airline ticket issuing apparatus 11, a check-in confirmation apparatus 39, a boarding confirmation apparatus 40, and an automatic entry card creating apparatus 41. The airline ticket issuing apparatus 11 is installed in a branch office of an airline and in a travel agency TA, and is connected via a communications line to a seat reserving system 38 possessed by a head office of the airline line. The check-in confirmation apparatus 39 is installed in a check-in counter CI in an airport AP, and connected via the communications line to the seat reserving system 38 and via a signal line to the boarding confirmation apparatus 40. The boarding confirmation apparatus 40 is installed in a boarding gate BG in the airport AP. The automatic entry card creating apparatus 41 is installed in an airplane F.

In the present system, an airline ticket 1 is issued as follows. To start with, a passenger, on the occasion of requesting a ticket, submits a reservation form in which items of boarding information and entry card information are filled-in, to the branch office FC of the airline or the travel agency TA, to which the reservation is applied. Herein, the boarding information written in the reservation form includes a name of passenger, a name of airline, a flight number, a boarding date, a boarding time, a name of departure airport, a name of arrival airport, a name of via-land, a class of seat, and a feature of seat (distinction between smoking/non-smoking seats, and so on) among items written in a table of FIG. 5. Further, the entry card information, as shown in the table of FIG. 5, includes a name of entry person, an age, a sex, an occupation, his or her legal domicile, a passport number, a purpose of entry, a place of stay, a number of days of stay and an address of place during stay. A person (operator) in charge in the airline FC or the travel agency TA operates a key of a key input terminal 12 (see FIG. 6) connected to the airline ticket issuing apparatus 11, and thus inputs the boarding information (words in English) and the entry card information (words in English) that are written in the reservation form. Thereupon, the airline ticket issuing apparatus 11 executes a process of confirming the reservation of the ticket with the seat reservation system 38 on the basis of the information input thereto, then receives an item of ticket issuance data from the seat reservation system 38, and automatically issues the airline ticket 1 on the basis of this item of the ticket issuance data. The thus issued airline ticket 1 is transferred to the passenger.

This airline ticket 1 is, as shown in FIG. 2, dividable at a perforated line 2 into a coupon (Coupon) 1a and a passenger ticket 1b. Further, the underside of the airline ticket 1 is previously formed with a magnetic stripe 3 defined as a single magnetic recording zone extending, orthogonally to the perforated line 2, over both of the coupon 1a and the passenger ticket 1b. This magnetic stripe 3 is, as illustrated in FIG. 3, formatted as a multi-track configuration in which (n/2+1) lines of tracks are arranged in a direction parallel to the perforated line 2. A first track among the plurality of tracks has the same length as an entire length (entire length of ticket) of the magnetic stripe 3, and is recorded beforehand with a predetermined series of data extending over the entire length of the tracks. The first track is used as a used-state judging track for judging whether or not the relevant airline ticket 1 is already used. The tracks other than the first track are, as shown in FIG. 4, halved by gaps formed in front and in rear of the perforated line 2. Each of the halved independent tracks is used as a single track which data can be individually written to and read from. More specifically, the tracks positioned on the side of the coupon 1a from the gap are assigned even-numbers (2-n), while the tracks positioned on the side of the passenger ticket 1b from the gap are assigned odd-numbers (3-n+1).

Then, the air ticket issuing apparatus 11 records the boarding information (containing a fare and a seat number) shown in FIG. 5 on the even-numbered tracks (track 2-track n), and the entry card information shown in FIG. 5 on the odd-numbered tracks (track 3-track n+1), and writes dummy data in the gap therebetween. With this contrivance, MS data can be independently read even after the air ticket 1 has been separated into the coupon 1a and the passenger ticket 1b. Further, the airline ticket issuing apparatus 11 visually prints respective items of boarding information containing the fare and the seat number on respective front surfaces of the coupon 1a and the passenger ticket 1b.

The passenger, when it becomes several hours before a boarding time on a boarding date, goes to the airport AP with the issued airline ticket 1, and makes a procedure for boading on the airplane F. To be specific, the passenger at first hands over the airline ticket 1 to the person in charge at the check-in counter CI, and asks him or her to confirm the reservation. In response to this, the person in charge operates the check-in confirmation apparatus 39 to read the boarding information from the airline ticket 1, thus confirming the information recorded on this airline ticket 1. At this time, the check-in confirmation apparatus 39 reads the boarding information from an area, corresponding to the coupon 1a, on the magnetic tracks 3 of the airline ticket 1, thereafter inquires the seat reservation system 38 in order to receive the confirmation data (boarding information registered in the seat reservation system 38) for confirming the boarding information on the airline ticket 1, thereby collating it with the boarding information on the airline ticket 1. Then, if coincident with each other, the person in charge returns the airline ticket 1 to the passenger as it is, on the assumption that the reservation has been confirmed.

Thereafter, it nears the boarding time, the passenger goes to the boarding gate BG with the airline ticket 1, and hands over the airline ticket 1 to the person in charge at the boarding gate. In response thereto, the person in charge lets this airline ticket 1 through the boarding confirmation apparatus 40 and makes the boarding confirmation. At this time, the boarding confirmation apparatus 40 reads the boarding information from the area, corresponding to the coupon 1a, on the magnetic tracks 3 of the airline ticket 1, thereafter receives the confirmation data (the boarding information read from the same airline ticket 1 by the check-in confirmation apparatus 39), and makes the boarding confirmation by collating the confirmation data with the boarding information on the airline ticket 1. Then, the person in charge, when completing the boarding confirmation because of the two items of information being coincident each other, divides off the airline ticket 1 along the perforated line 2, then transfers the passenger ticket 1b to the passenger, and collects the coupon 1a.

Next, the passenger boards the airplane F with the transferred passenger ticket 1b, and sits in the seat identical with the seat number printed on the passenger ticket 1b. Thereafter, in the airplane F during a flight, a crew member collects the passenger ticket 1b held by the passenger and inserts the collected passenger ticket 1b into the automatic entry card creating apparatus 41. Thereupon, this automatic entry card creating apparatus 41 reads entry card information from the magnetic tracks 3 on the inserted passenger ticket 1b, and automatically creates an entry card on the basis of the thus read entry card information. Then, the crew member returns to the passenger the automatically created entry card and the passenger ticket 1b. The passenger signs the entry card received, thus completing the creation of the entry card. Thereafter, the passenger gets off the airplane with the entry card and makes an entry procedure by submitting this entry card to an immigration office in a country that the passenger enters.

The respective apparatuses constituting the present system will hereinafter be explained.

(2) Airline ticket Issuing Apparatus

FIG. 6 is an explanatory diagram illustrating an outline of the airline ticket issuing apparatus. As shown in FIG. 6, the airline ticket issuing apparatus 11 is connected to the key input terminal (e.g., a personal computer) 12 through which data (i.e., the boarding information and the entry card information) are input according to key input operation, and also connected via the communications line to the seat reservation system 38. This airline ticket issuing apparatus 11 is constructed roughly of a ticket editing and issuing unit 13 and a ticket issuance control unit 14 that are constructed by electric circuits, and a ticket issuing mechanism 15 that is a mechanism controlled by the ticket issuance control unit 14.

(2-1)

The ticket editing and issuing unit 13 is connected directly to the key input terminal 12, and receives, from this key input terminal 12, the boarding information (words in English) and the entry card information (words in English) input by the person in charge through the key input operation thereof on the basis of the written content of the reservation form. Further, the ticket editing and issuing unit 13 confirms a seat reservation through communications with the seat reservation system 38, and receives ticket issue data. Then, the ticket editing and issuing unit 13 edits print data and MS data (magnetic information to be recorded on the magnetic stripe 3 on the air ticket 1) on the basis of the ticket issuance data, the boarding information and the entry card information, and transmits these items of print data and MS data to the ticket issuance control unit 14. The ticket issuance control unit 14, upon receiving these items of print data and MS data, controls the ticket issuing mechanism 15 on the basis of the print data and the MS data. The ticket issuing mechanism 15 prints visual information corresponding to the print data on the front surface of the airline ticket 1 under the control of the ticket issuance control unit 14, then records the MS data on the magnetic stripe 3 of the airline ticket 1, and issues the air ticket 1. Hereinbelow, construction of the ticket editing and issuing unit 13, the ticket issuance control unit 14, and the ticket issuing mechanism 15 will be respectively explained in greater detail.

Figure 7:
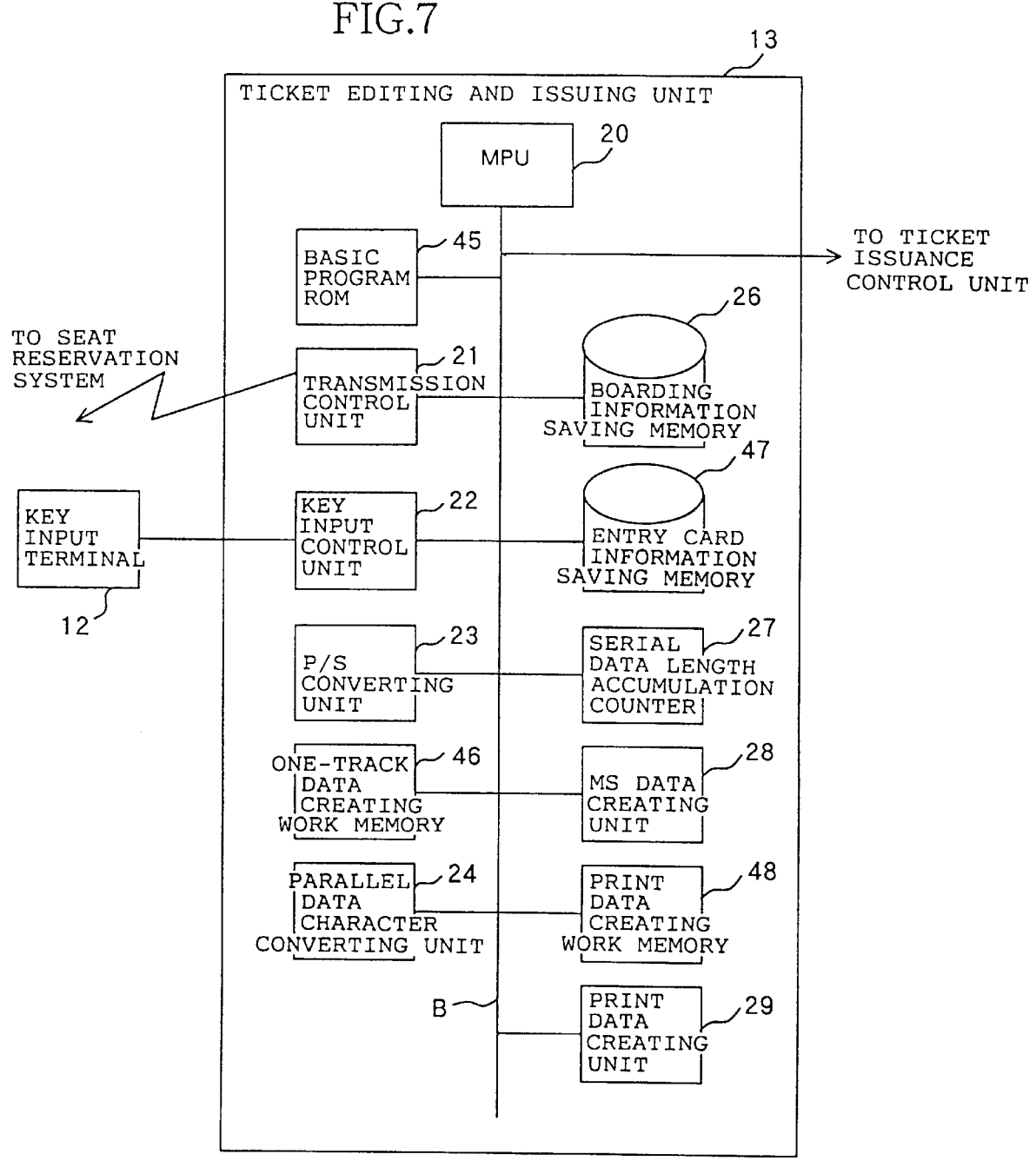
FIG. 7 is a block diagram illustrating a detailed construction of a ticket editing and issuing unit shown in FIG. 6.

FIG. 7 is a block diagram fully showing the construction of the ticket editing and issuing unit 13. As illustrated in FIG. 7, the ticket editing and issuing unit 13 is constructed of an MPU 20, a basic program ROM 45, a transmission control unit 21, a key input control unit 22, a P/S converting unit 23, a one-track data creating work memory 46, a parallel data character converting unit 24, a boarding information saving memory 26, an entry card information saving memory 47, a serial data length accumulation counter 27, an MS data creating unit 28, a print data creating work memory 48, and a print data creating unit 29, which are connected via a bus B to each other. The following are functions of these units.

The transmission control unit 21 is a communications interface connected to the seat reservation system 38 under communications control, and transmits and receives telegrams to and from this seat reservation system 38.

The key input control unit 22 is an interface connected to the key input terminal 12, and executes input control of the data such as the boarding information/entry card information and so on that are inputted from the key input terminal 12 through the operation by the operator.

Figures 8, 9:
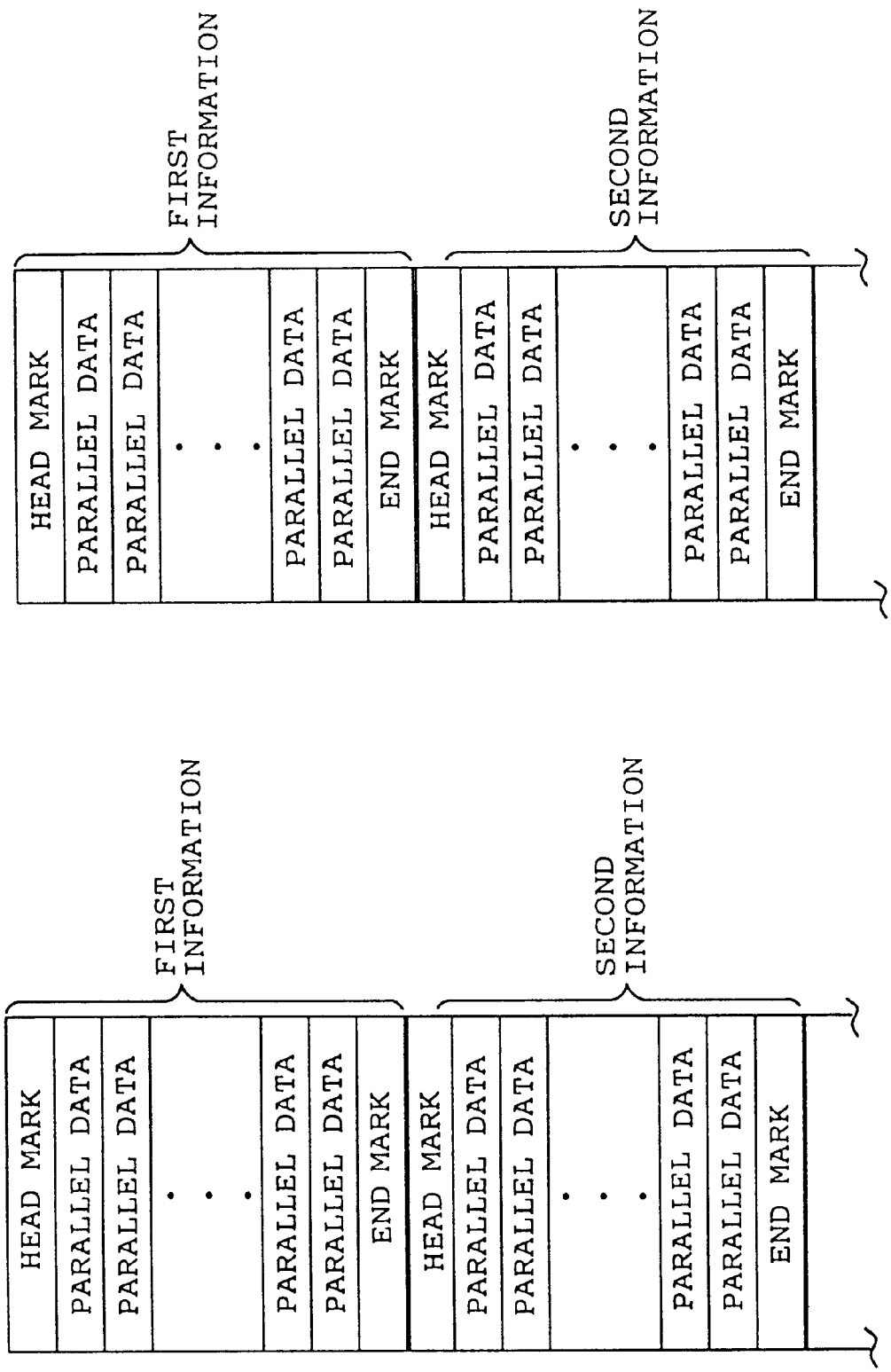
FIG. 8 is a memory map showing a structure of data stored in a boarding information saving memory shown in FIG. 7.
FIG. 9 is a memory map showing a structure of data stored in an entry card information saving memory shown in FIG. 7.

The boarding information saving memory 26 is a RAM (Random Access Memory) stored with the boarding information inputted from the key input terminal 12 through the key input control unit 22. As shown in FIG. 8, in the boarding information saving memory 26, each item of data constituting the boarding information consists of a head mark showing a head of the item, plural pieces of parallel format data (ASCII codes) respectively showing characters (alphabets, numerals, symbols) constituting contents of the item, and an end mark. Thus, each item of data consisting of one set of head mark/plural pieces of parallel format data/ end mark, is stored in an individual area within the boarding information saving memory 26.

The entry card information saving memory 47 is a RAM stored with the entry card information input from the key input terminal 12 via the key input control unit 22. As shown in FIG. 9, within the entry card information saving memory 47, each item of data constituting the entry card information consists of a head mark showing a head of the item, plural pieces of parallel format data (ASCII codes) respectively showing characters (alphabets, numerals, symbols) constituting contents of the item, and an end mark. Thus, each item of data consisting of one set of head mark/plural pieces of parallel format data/end mark, is stored in an individual area within the entry card information saving memory 47.

The P/S converting unit 23 converts, into data in a serial format, the parallel format boarding information stored in the boarding information saving memory 26, and the parallel format entry card information stored in the entry card information saving memory 47.

The serial data length accumulation counter 27 is a counter for measuring a data length of the serial format data converted by the P/S converting unit 23.

The one-track data creating work memory 46 is a memory to be stored with the serial data for one track, which are converted by the P/S converting unit 23, and saving the serial data to be transferred to the MS data creating unit 28.

The MS data creating unit 28 arranges (1+n/2) lines of serial data successively transferred from the one-track data creating work memory 46, and thus edits the MS data for a single airline ticket 1. The MS data edited by this MS data creating unit 28 are transferred to the ticket issuance control unit 14.

The parallel data character converting unit 24 converts, into character data (character data for printing), the parallel format boarding information stored in the boarding information saving memory 26 and the parallel format entry card information stored in the entry card information saving memory 47.

The print data creating work memory 48 is a memory which stores each piece of character data converted by the parallel data character converting unit 24, on which an operation of converting these pieces of character data into print data is performed.

The print data creating unit 29 converts each piece of character data stored in the print data creating work memory 48 into print data (dot data) to be printed by a printer. The print data created by this print data creating unit 29 are transferred to the ticket issuance control unit 14.

The MPU 20 controls the respective mechanism within the ticket editing and issuing unit 13 by executing a ticket editing and issuing program stored in the basic program ROM 45. The basic program ROM 45 is stored with a basic program such as a ticket editing and issuing program (consisting of an MS data editing module and a print data editing module) necessary for the control by the MPU 20.

FIG. 10 is a flowchart showing the MS data editing module in the ticket editing and issuing program stored in the basic program ROM 45 and executed by the MPU 20. This MS data editing module starts with such a trigger that the boarding information inputted through the key input control unit 22 is written to the boarding information saving memory 26, the entry card information is written to the entry card information saving memory 47, and the ticket issuance data is received via the transmission control unit 21.

According to this MS data editing module, in first step S000 (see FIG. 10) after the start, the MPU 20 transmits judgement data (serial data) to be written to a using judgement track (track 1) of the magnetic tracks 3 to the MS data creating unit 28, and gives an indication of a line feed.

In next step S001, the MPU 20 acquires one piece of parallel data out of the boarding information saving memory 26. In next step S002, the MPU 20 checks whether or not the acquired parallel data corresponds to the head mark of the first item. Then, this piece of parallel data does not correspond to the head mark of the first item, the MPU 20 gets the processing back to step S001 and acquires the next parallel data.

As a result of repeating these steps S001 and S002, if the parallel data corresponding to the head mark of the first item can be acquired, the MPU 20 transfers the acquired parallel data to the P/S converting unit 23 in step S003, and makes this P/S converting unit 23 convert the parallel data into serial data in terms of format.

In next step S004, the MPU 20 instructs the serial data length accumulation counter 27 to count a serial data length (to add it to a count value) after the conversion effected in step S003.

In next step S005, the MPU 20 additionally writes the serial data format-converted by the P/S converting unit 23 to the one-track data creating work memory 46.

In next step S006, the MPU 20 checks whether or not the parallel data acquired latest from the boarding information saving memory 26 corresponds to the end mark. Then, if not corresponding to the end mark, the MPU 20 checks whether or not the counter value of the serial data length accumulation counter 27 reaches a value equivalent to one track (a coupon data length shown in FIG. 4) on the side of the coupon 1a in step S007. Then, if the counter value does not reach the value equivalent to one track on the side of the coupon 1a, the MPU 20 acquires one piece of parallel data from the boarding information saving memory 26 in step S008, and thereafter returns the processing to step S003.

Whereas if it is judged in step S006 that the parallel data acquired latest corresponds to the end mark, and if it is judged in step S007 that the counter value reaches the value equivalent to one track of the coupon 1a, the MPU 20 executes a dummy data adding process in step S009. With this dummy data adding process executed, if the end mark is acquired before the counter value reaches the value equivalent to one track (a coupon data quantity) of the coupon 1a, the dummy data corresponding to the remaining track and the gap are additionally written into the one-track data creating work memory 46. If the counter value reaches the value equivalent to one track (the coupon data quantity) of the coupon 1a, the dummy data corresponding to the gap (see FIG. 4) are additionally written into the one-track data creating work memory 46. If the transfer of all items of the boarding information to the MS data creating unit 28 has been completed (see step S020), the dummy data corresponding to one track of the coupon 1a and the gap are additionally written into the one-track data creating work memory 46. This dummy data adding process will be explained in greater detail afterward with reference to FIG. 11.

Upon a completion of step S009, the MPU 20 checks whether or not there is finished the transfer, to the MS data creating unit 28, of all items of the entry card information stored in the entry card information saving memory 47 in step S010. Then, if the transfer of all items of the entry card information is not yet finished, the MPU 20 advances the processing to step S011.

In step S011, the MPU 20 checks whether or not an acquisition of the head mark of the first item in the entry card information is completed. Then, if not yet completed, the MPU 20 acquires one piece of parallel data out of the entry card information saving memory 47 in step S021. In next step S022, the MPU 22 checks whether or not the acquired parallel data corresponds to the head mark of the first item. Then, if this piece of parallel data does not correspond to the head mark of the first item, the MPU 20 returns the processing to step S021, and acquires the next parallel data. As a result of repeating these steps S001 and S002, if acquiring the parallel data corresponding to the head mark of the first item, the MPU 20 advances the processing to step S013.

Whereas if it is judged in step S011 that the acquisition of the head mark of the first item in the entry card information is completed, the MPU 20 acquires one piece of parallel data from the entry card information saving memory 47 in step S012, and makes the processing proceed to step S013.

In step S013, the MPU 20 transfers the parallel data acquired in step S012 or S021 to the P/S converting unit 23, and instructs this P/S converting unit 23 to do the format conversion of the parallel data into serial data.

In next step S014, the MPU 20 instructs the serial data length accumulation counter 27 to count the serial data length (to add it to the count value) after the conversion in step S013.

In next step S015, the MPU 20 additionally writes the serial data format-converted by the P/S converting unit 23 to the one-track data creating work memory 46.

In next step S016, the MPU 20 checks whether or not the parallel data acquired latest from the boarding information saving memory 26 corresponds to the end mark. Then, if not corresponding to the end mark, the MPU 20 checks whether or not the counter value of the serial data length accumulation counter 27 reaches a value equivalent to one track (a passenger ticket data length shown in FIG. 4) on the side of the passenger ticket 1b in step S017. Then, if the counter value does not reach the value equivalent to one track (the passenger ticket data length) on the side of the passenger ticket 1b, the MPU 20 returns the processing to step S012.

Whereas if it is judged in step S017 that the counter value reaches the value equivalent to one track (the passenger ticket data length) of the passenger ticket 1b as a result of repeating a loop of processes in steps S012 through S017, the MPU 20 advances the processing to step S018. In this step S018, the MPU 20 transfer, to the MS data creating unit 28, the serial data (a series of serial data consisting of the serial data for one track of the coupon 1a, the dummy data corresponding to the gap, and the serial data for one track of the passenger ticket 1b) written in the one-track data creating work memory 46. The MPU 20, after completing step S018, advances the processing to step S019.

Meanwhile, if it is judged in step S016 that the parallel data acquired latest corresponds to the end mark as a result of repeating a loop of processes in steps S012 through S017, the MPU 20 executes a dummy data adding process in step S023. With this dummy data adding process executed, the dummy data corresponding to the remaining tracks are additionally written into the one-track data creating work memory 46. This dummy date adding process will be explained in greater detail afterward with reference to FIG. 11.

In next step S024, the MPU 20 transfers, to the MS data creating unit 28, the serial data written in the one-track data creating work memory 46. The MPU 20, after completing step S024, advances the processing to step S019.

On the other hand, if it is judged in step S010 that the transfer, to the MS data creating unit 28, of all items of the entry card information is finished, the MPU 20 executes the dummy data adding process in step S025. With this dummy data adding process executed, the dummy data corresponding to one track of the passenger ticket 1b are additionally written into the one-track data creating work memory 46. This dummy data adding process will be described afterward in greater detail with reference to FIG. 11.

In next step S026, the MPU 20 transfers the serial data written in the one-track data creating work memory 46 to the MS data creating unit 28.

In next step S027, the MPU 20 checks whether or not the transfer, to the MS data creating unit 28, of all items of the boarding information stored in the boarding information saving memory 26, is finished. Then, if the transfer of all items of the boarding information is not yet finished, the processing proceeds to step S019.

In step S019, the MPU 20 clears the counter value of the serial data length accumulation counter 27.

In next step S020, the MPU 20 checks whether or not the transfer, to the MS data creating unit 28, of all items of the boarding information stored in the boarding information saving memory 26 is finished. Then, the transfer of all items of the boarding information is not finished, the MPU 20 performs a line feed with respect to a transfer position of the serial data in the MS data creating unit 28 in step S029, and thereafter returns the processing to step S008. Whereas if the transfer of all items of the boarding information is ended, the MPU 20 returns the processing to step S009.

On the other hand, after judging in step S010 that the transfer of all items of the entry card information to the MS data creating unit 28 is finished, if it is judged in step S027 that the transfer of all items of the boarding information to the MS data creating unit 28 is finished, (1+n/2) lines of serial data are written in parallel in the MS data creating unit 28. Then, the MPU 20 transfers the (1+n/2) lines of serial data (the MS data) in parallel to the ticket issuance control unit 14 in step S028. Signal lines for connecting the ticket editing and issuing unit 13 to the ticket issuance control unit 14 consist of at least (1+n/2) lines in order to enable the (1+n/2) lines of serial data to be transferred.

Upon a completion of step S028, this MS data editing module is ended, and subsequently a print data editing module is executed. Then, the print data created by the print data creating unit 29 are transferred to the ticket issuance control unit 14.

Figure 11:
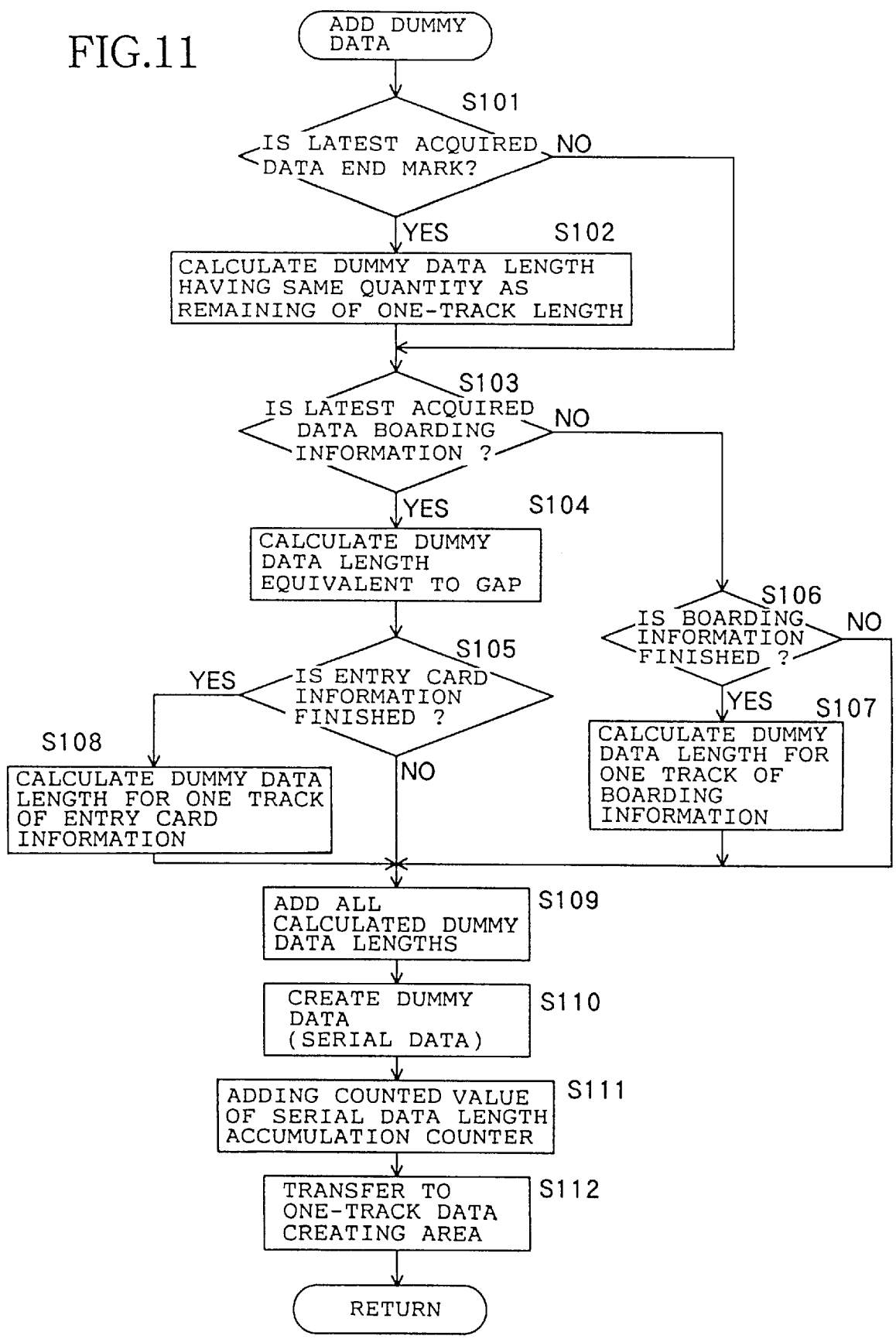
FIG. 11 is a flowchart showing a dummy data adding subroutine executed in steps S009, S023 and S025 in FIG. 10.

Next, a dummy data adding process subroutine executed in steps S009, S023 and S025 shown in FIG. 10 will be explained with reference to FIG. 11. In first step S101 after entering this subroutine, the MPU 20 checks whether or not the parallel data acquired latest corresponds to the end mark. Then, if not corresponding to the end mark, the MPU 20 advances the processing directly to step S103. Whereas if the parallel date acquired latest corresponds to the end mark, the MPU 20 calculates a dummy data length corresponding to the remaining tracks on the basis of the count value of the serial data length accumulation counter 27 in step S102. After completing step S102, the MPU 20 moves the processing forward to step S103.

In step S103, the MPU 20 checks whether or not the parallel data acquired latest is the boarding information (alternatively the head mark or the end mark thereof). Then, if the parallel data acquired latest is not the boarding information, in step S106, the MPU 20 checks whether or not the transfer of all items of the boarding information is finished. Then, the MPU 20, if the transfer thereof is finished, advances the processing directly to step S109. Whereas if not yet finished, the MPU 20 calculates a dummy data length corresponding to one track of the coupon 1a in step S107, and thereafter moves the processing forward to step S109.

Whereas if the parallel data acquired latest is the boarding information, the MPU 20 calculates a dummy data length corresponding to a gap length in step S104. In next step S105, the MPU 20 checks whether or not the transfer of all items of the entry card information to the MS data creating unit 28 is ended. Then, the MPU 20, if the transfer is finished, advances the processing directly to step S109. Whereas if not yet finished, the MPU 20 calculates a dummy data length corresponding to one track of the passenger ticket 1b in step S108, and thereafter advances the processing to step S109.

In step S109, the MPU 20 adds all the dummy data lengths calculated in steps S102, S104, S107 or S108.

In next step S110, the MPU 20 creates dummy data in the serial data format based on the dummy data length calculated in step S109.

In next step S111, the MPU 20 instructs the serial data length accumulation counter 27 to count (to add to the count value) the dummy data length calculated in step S109.

In next step S112, the MPU 20 additionally writes once the dummy data created in step S110 into the one-track data creating work memory 46. When finishing step S112, the MPU 20 finishing this dummy data adding subroutine and returns the processing to the previous processing position in FIG. 10.

As described above, the MPU 20 of the ticket editing and issuing unit 13 executes the MS data editing module in the ticket editing and issuing program and thereby alternately reads the boarding information (the parallel data) in the boarding information saving memory 26 and the entry card information (the parallel data) in the entry card information saving memory 47 on the unit of a one-track length (a one-track length of the coupon, a one-track length of the passenger ticket). Then, the MPU 20 sequentially writes, into the one-track data creating work memory 46, the boarding information in serial data format corresponding to the one track length of the coupon, the dummy data corresponding to the gap, and the entry card information in serial data format corresponding to the one track length of the passenger ticket. At this time, if each item of the boarding information or the entry card information terminates without reaching the one track length, the dummy data corresponding to a deficiency of each item is supplemented. Further, if either the boarding information or the entry card information is left, nevertheless all items of the other information are finished, the dummy data is supplemented in a position where the other serial data are to be written.

(2-2) Ticket Issuing Mechanism

Figure 12:
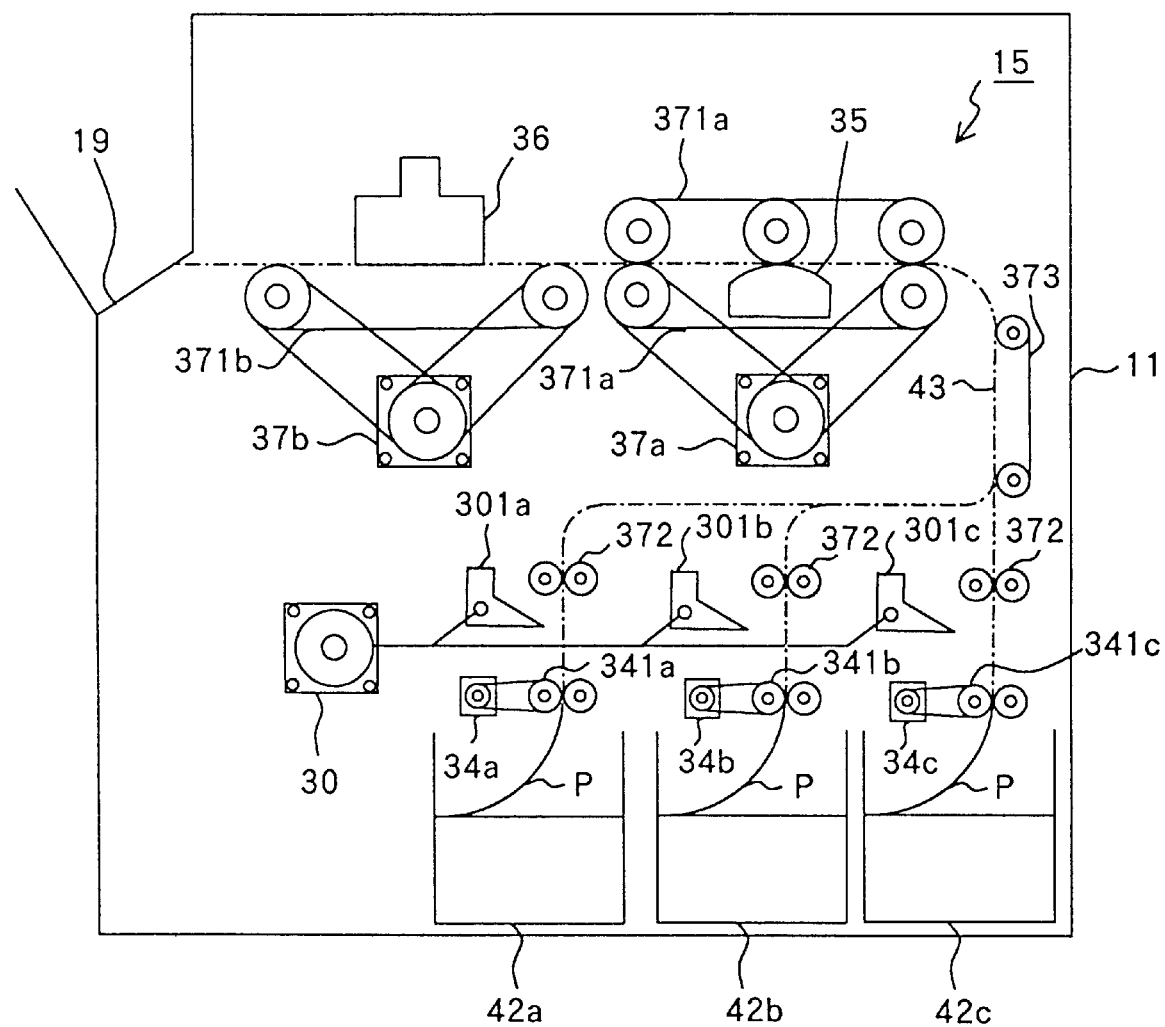
FIG. 12 is a mechanism diagram showing a detailed structure of a ticket issuing mechanism shown in FIG. 6.

FIG. 12 is a schematic diagram showing a mechanical structure of the ticket issuing mechanism 15. As illustrated in FIG. 12, three pieces of ticket storing units 42a, 42b, 42c stored with a serial sheet of paper P for the airline ticket 1 before being printed, are installed in the lowest portion of the ticket issuing mechanism 15. In case the airline ticket issuing apparatus 11 is installed in the airline branch office FC, the sheets P assuming colors different from each other according to the seat classes are stored respectively in the ticket storing units 42a, 42b, 42c. Meanwhile, in case the airline ticket issuing apparatus 11 is installed in the travel agency TA, the sheets having patterns different from each other according to the airlines are stored respectively in the ticket storing units 42a, 42b, 42c. Moreover, each sheet P is perforated along a boundary line between each airline ticket 1 as well as along the perforated line 2.

The sheet P stored in the first ticket storing unit 42a is fed out by a first ticket feeding roller 341a rotated by a first ticket feeding motor 34a, and sent toward a carry path 43. Similarly, the sheet P stored in the second ticket storing unit 42b is fed out by a second ticket feeding roller 341b rotated by a first ticket feeding motor 34b, and sent toward the carry path 43. Likewise, the sheet P stored in the third ticket storing unit 42c is fed out by a third ticket feeding roller 341c rotated by a third ticket feeding motor 34c, and sent toward the carry path 43. Note that ticket separating cutters 301a, 301b, 301c are respectively provided between the ticket feeding rollers 341a–341c and the carry path 43. These ticket separating cutters 301a–301c are operated by a separating cutter operation motor 30, and cut away the sheet P which is fed by each ticket feeding roller 341a–341c, on the airline ticket 1 basis.

Disposed midways of the carry path 43 is a magnetic head 35 for writing the MS data received from the ticket issuance control unit 14 onto the magnetic stripe 3 on the sheet P (the airline ticket 1) existing on the carry path 43. This magnetic head 35 contains (1+n/2) pieces of magnetic cores for independently writing the serial data so that (1+n/2) lines of serial data constituting the MS data can be written in parallel to the magnetic stripe 3. These magnetic cores are arranged in a direction orthogonal to the direction of the carry path 43.

A first ticket carry crawler 371a for carrying the sheet P (the airline ticket 1) along the carry path 43, is installed on the carry path 43 in the vicinity of the magnetic head 35. The first ticket carry crawler 371a is driven by a first ticket carry drive motor 37a.

A roller 372 and a crawler 373 for carrying the airline ticket 1 cut away by the ticket separating cutters 301a–301c up to the first ticket carry crawler 371a along the carry path 43, are provided between the each proximal end of each carry path 43 and the first ticket carry crawler 371a.

Disposed in the vicinity of a terminal of the carry path 43 is a printer 36 for printing the print data received from the ticket issuance control unit 14 on the front surface of the sheet P (the airline ticket 1) existing on the carry path 43.

A second ticket carry crawler 271b for carrying the airline ticket 1 along the carry path 43, is installed on the carry path 43 in the close proximity to this printer 36. The second ticket carry crawler 371b is driven by a second ticket carry drive motor 37b.

The terminal of the carry path 43 faces a ticket storage unit 19 provided on an external surface of a box body of the airline ticket issuing apparatus 11. Accordingly, the airline ticket 1 carried by the second ticket carry crawler 371b are discharged into the ticket storage unit 19.

(2-3) Ticket Issuance Control Unit

Figure 13:
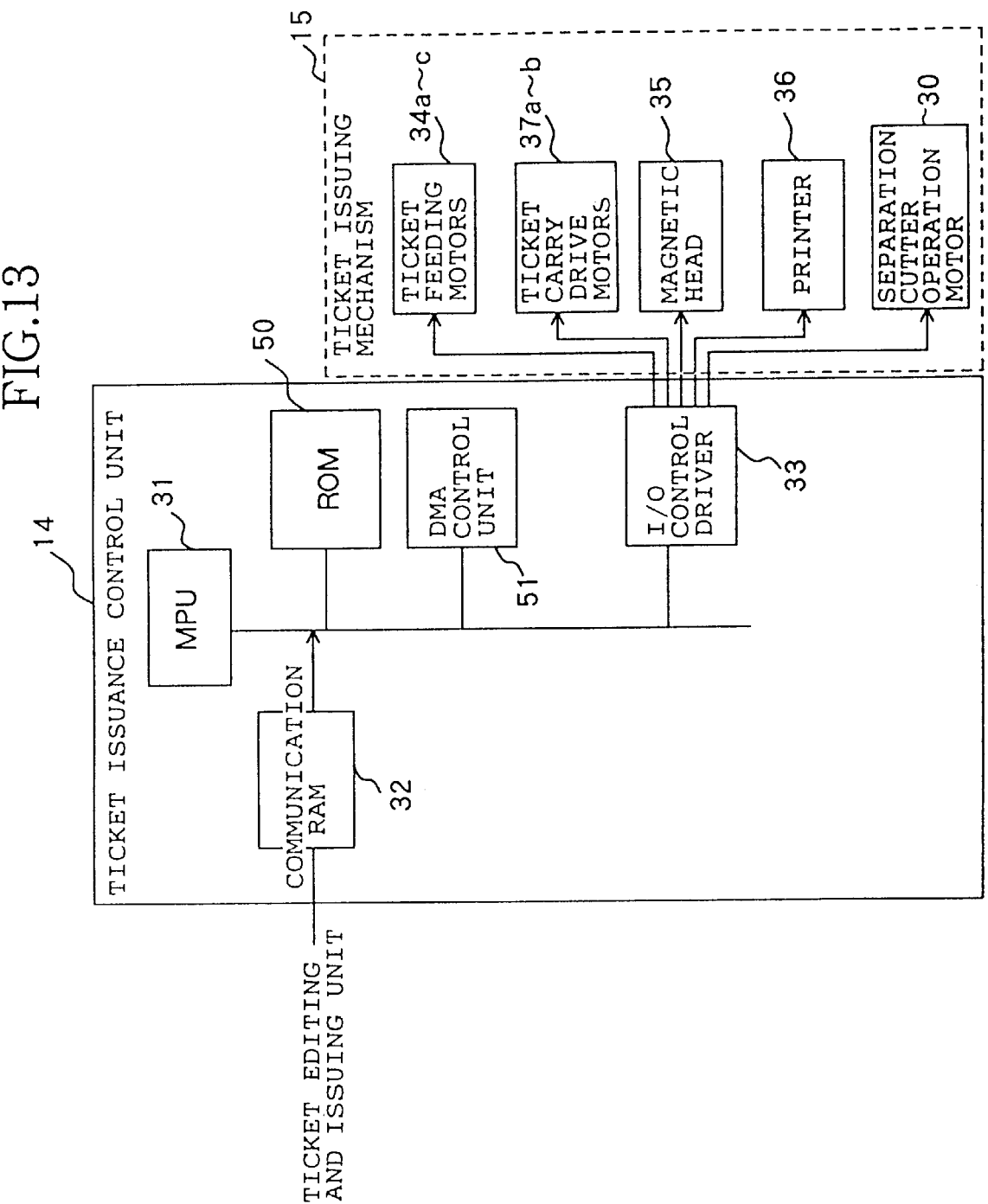
FIG. 13 is a block diagram showing a detailed construction of a ticket issuance control unit shown in FIG. 6.

Given next is an explanation of the ticket issuance control unit 14 as shown in FIG. 13 for controlling the ticket issuing mechanism 15 on the basis of the MS data and the print data that are received from the ticket editing and issuing unit 13. FIG. 13 is a block diagram fully showing a construction of the ticket issuance control unit 14. As shown in FIG. 13, the ticket issuance control unit 14 comprises an MPU 31, a communications RAM 32, a ROM 50, a DMA control unit 51 and an I/O control driver 33, which are connected to each other via a bus. The following are functions of these respective units.

The communications RAM 32 performs a role of a buffer when data communications are carried out under DMA (Direction Memory Access) control between the MPU 31 and the MPU 20 in the ticket editing and issuing unit 13. Namely, the communications RAM 32 is a memory which the information for communications is written to and read from during the communications between those two MPUs 31 and 20.

The DMA control unit 51 accesses the communications RAM 32 and executes data transfer control under the DMA control.

The I/O control driver 33 drives the ticket feeding motors 34a–34c, the ticket carry drive motors 37a–37b, the magnetic head 35, the printer 36 and the separating cutter operation motor 30.

The MPU 31 executes the ticket issuance control program in the ROM 50, thereby controlling the respective units within the ticket issuance control unit 14. The ROM 50 is stored with the ticket issuance control program needed for the ticket issuance control by the MPU 31 and with a basic CG pattern.

Figure 14:
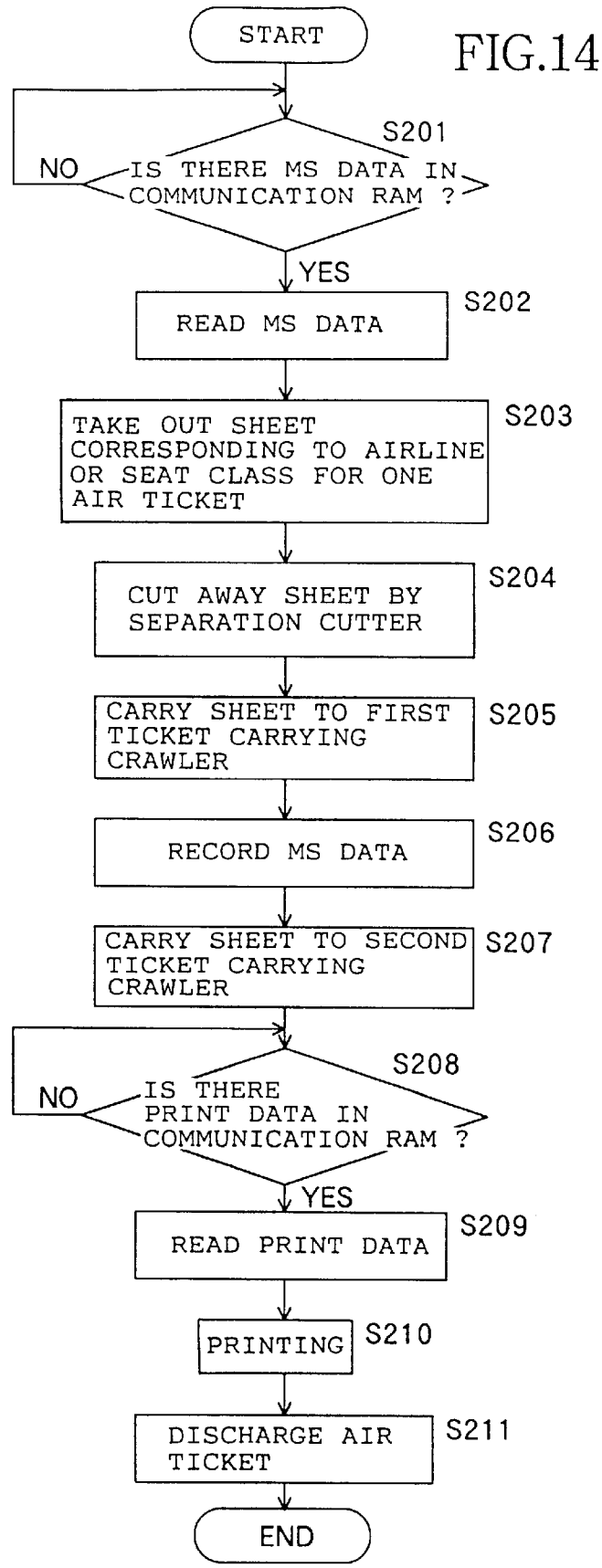
FIG. 14 is a flowchart showing a ticket issuance control program executed by the MPU in FIG. 13.

Next, the ticket issuance control program stored in the ROM 50 and executed by the MPU 31 will be explained with reference to a flowchart of FIG. 14. According to this ticket issuance control program, in first step S201, the MPU 31 waits until the MS data are written into the communications RAM 32.

When the MS data have been written into the communications RAM 32, the MPU 31 causes the DMA control unit 51 to read the MS data from the communications RAM 32 under the DMA control in step S202.

In next step S203, the MPU 31 identifies the name of the airline and the seat class on the basis of the MS data read therefrom. Then, the sheet P corresponding to the thus identified name of airline or seat class is fed out for the single airline ticket by controlling one of the ticket feeding motors 34a–34c.

In next step S204, the MPU 31 controls the separating cutter operation motor 30, whereby making the ticket separating cutters 301a–301c cut away the sheet P fed out in step S203.

In next step S205, the MPU 31 causes the unillustrated drive motors to drive the roller 372 and the crawler 373 disposed midways of the carry path 43, so that the sheet P cut away in step S204 is carried to a position contiguous to the first ticket carry crawler 371a.

In next step S206, the MPU 31 transmits the MS data to the magnetic head 35, synchronizing with drive control of the first ticket carry drive motor 37a, so that the MS data consisting of (1+n/2) lines of serial data are simultaneously written to the magnetic stripe 3 of the sheet P (the air ticket 1).

In next step S207, the MPU 31 indicates the first ticket carry drive motor 37a to further drive the first carry crawler 371a, with the result that the sheet P (the air ticket 1) is carried to a position contiguous to the second ticket carry roller 371b.

In next step S208, the MPU 31 waits till the print data are written into the communications RAM 32.

When the print data have been written into the communications RAM 32, in step S209, the MPU 31 causes the DMA control unit 51 to read the print data from the communications RAM 32 under the DMA control.

In next step S210, the MPU 31 transmits the print data to the printer 36, synchronizing with the drive control of the second ticket carry drive motor 37b, so that characters corresponding to the print data are printed on the front surface of the sheet P (the air ticket 1).

In next step S211, the MPU 31 instructs the second ticket carry drive motor 37b to further drive the second carry crawler 371b, thereby discharging the air ticket 1 recorded with the MS data and printed with the characters, into the ticket receiving unit 19.

In the manner described above, there is issued the airline ticket 1 which is printed with the visual information on the surface thereof, and which is recorded with the MS data on the magnetic stripe 3 on the underside thereof. In this case, the gap of the MS data is superposed on the perforated line 2 of the airline ticket 1, all items of the serial data indicating the boarding information are written into only areas (even-numbered tracks), positioned on the side of the coupon 1a, of the magnetic stripe 3, and all items of the serial data indicating the entry card information are written into only areas (odd-numbered tracks), positioned on the side of the passenger ticket 1b, of the magnetic stripe 3. Accordingly, even after the airline ticket 1 has been separated along the perforated line 2 into the coupon 1a and the passenger ticket 1b, it is feasible to solely read the entry card information.

(2-4) Explanation of Processes by Whole Airline Ticket Issuing Apparatus

Processes by the whole airline ticket issuing apparatus 11 will hereinafter be explained. When the operator (the person in charge) inputs the data (the boarding information and the entry card information, etc.) on the reservation form submitted by the passenger by operating the key input terminal 12, these items of data are transmitted via the key input terminal 12 to the airline ticket issuing apparatus 11. In the airline ticket issuing apparatus 11, when the key input control unit 22 receives these items of data, the MPU 20 is informed of the same data.

The MPU 20 receiving the data stores the boarding information contained in these items of data in the boarding information saving memory 26, and stores the entry card information in the entry card information saving memory 47. Thereafter, the MPU 20 instructs the transmission control unit 21 to transmit the boarding information to the seat reservation system 38 in order to reserve a seat. This seat reservation system 38 collates the boarding information with a state of reservation, and, if reserving a seat, sends the ticket issuance data back to the airline ticket issuing apparatus 11.

The ticket editing and issuing unit 13 of the airline ticket issuing apparatus 11 receiving the thus sent-back ticket issuance data, executes a ticket editing and issuing process based on this item of ticket issuance data. In this ticket editing and issuing process, the MS data and the print data for printing the visual information are edited based on the boarding information saved in the boarding information saving memory 26 and the entry card information saved in entry card information saving memory 47.

Next, the ticket issuance control unit 14 of the airline ticket issuing apparatus 11 feeds out the sheet P for the airline ticket 1, records the edited MS data on the magnetic stripe 3 provided on the underside of the sheet P and prints the edited print data on the front surface of the sheet P. The ticket issuance control unit 14 discharges into the ticket storage unit 19 the airline ticket 1 on which the MS data are recorded and the print data are printed. Thus, the airline ticket 1 is automatically issued.

17

(3) Automatic entry card creating Apparatus

Figure 15:
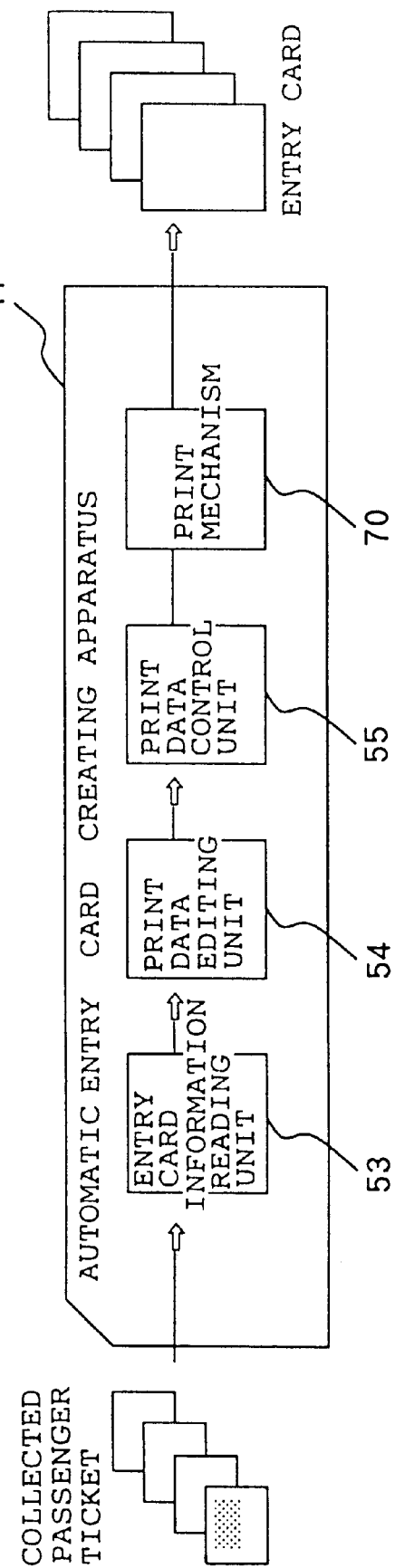
FIG. 15 is a block diagram illustrating an outline of a construction of an automatic entry card creating apparatus shown in FIG. 1.
Figure 16:
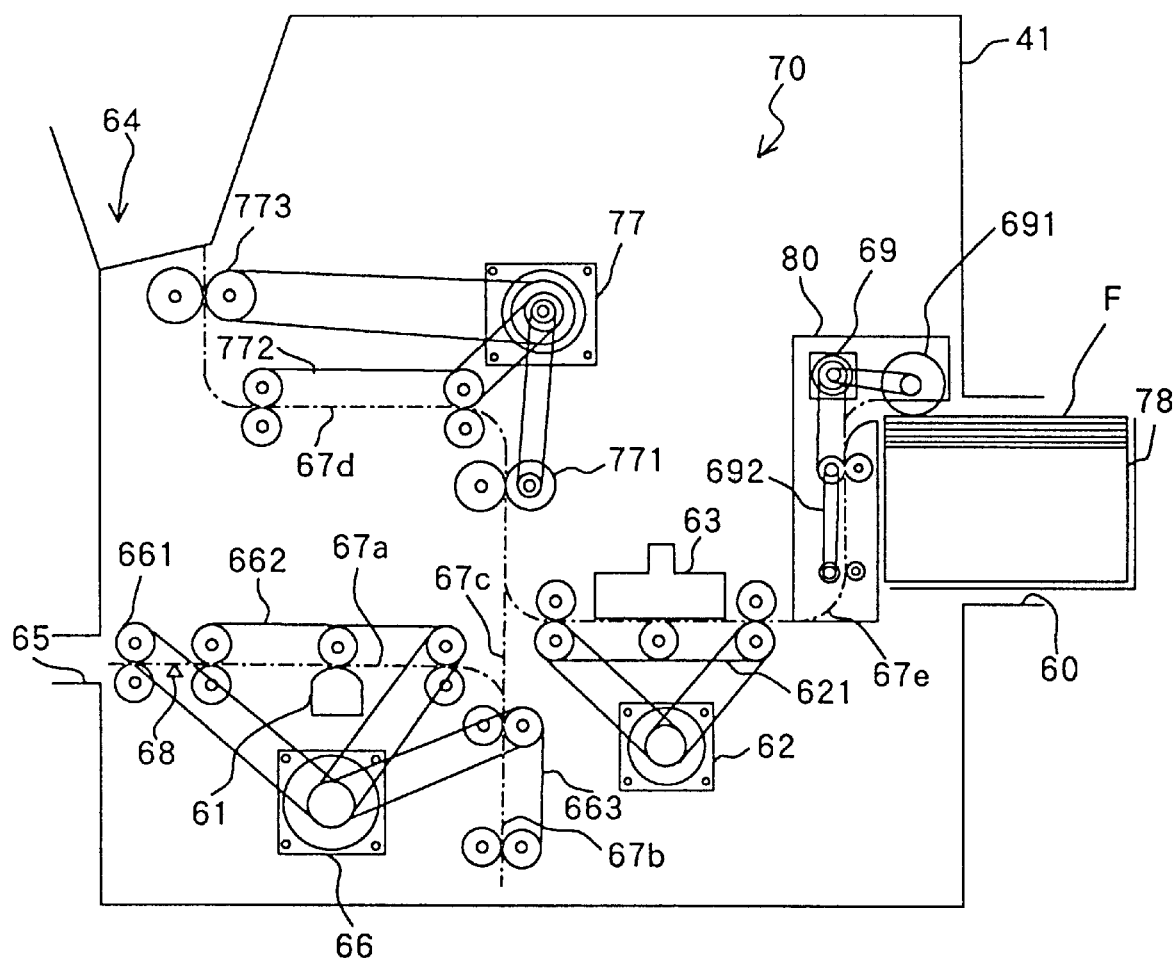
FIG. 16 is a mechanism diagram showing a structure of a print mechanism of the automatic entry card creating apparatus shown in FIG. 15.
Figure 17:
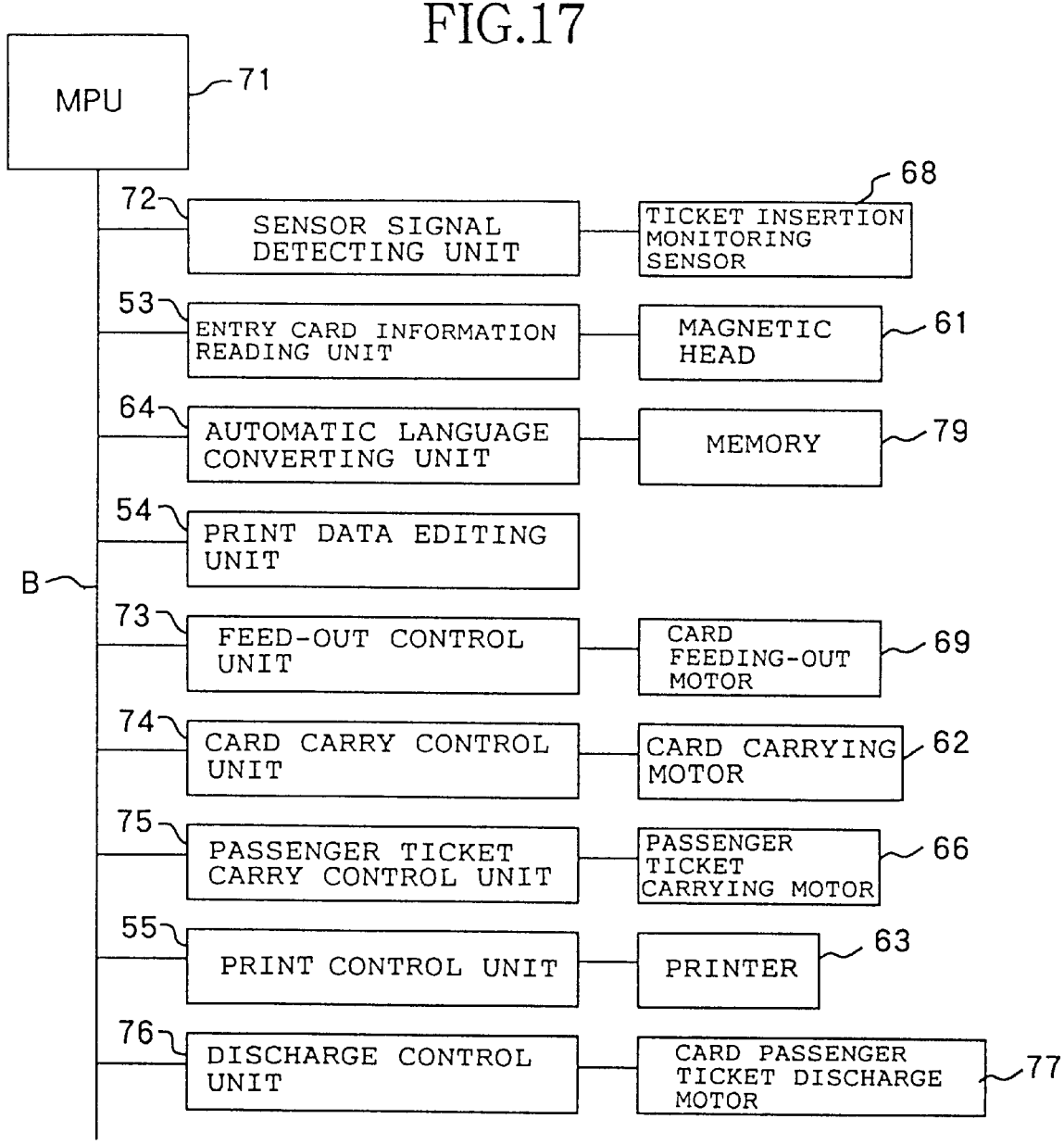
FIG. 17 is a block diagram illustrating a control circuit of the automatic entry card creating apparatus shown in FIG. 15.

FIG. 15 is an explanatory diagram illustrating an outline of the automatic entry card creating apparatus 41. Further, FIG. 16 is a mechanism diagram showing a print mechanism within this automatic entry card creating apparatus 41. Moreover, FIG. 17 is a block diagram showing a control circuit in the automatic entry card creating apparatus 41. Hereinafter, the automatic entry card creating apparatus 41 will be explained with reference to these Figures.

The automatic entry card creating apparatus 41 is installed in the airplane F, and automatically creates an entry card on the basis of the entry card information recorded on the magnetic stripe 3 of the passenger ticket 1b.

(3-1) Print Mechanism

To begin with, a structure of a print mechanism 70 in the automatic entry card creating apparatus 41 will be described.

A passenger ticket inserting port 65 into which the passenger ticket 1b is inserted, is formed in a side surface of the automatic entry card creating apparatus 41. A passenger ticket pulling-in roller 661 driven by a passenger ticket carry motor 66 is provided on the inside of the passenger ticket inserting port 65. The passenger ticket 1b inserted into the passenger ticket inserting port 65 and then pulled in by the passenger ticket pulling-in roller 661, is carried along a passenger ticket carry path 67a. Note that a passenger ticket insertion monitoring sensor 68 for detecting that the passenger ticket 1b is inserted, is provided inwardly of the passenger ticket pull-in roller 661.

A magnetic head 61 for reading the MS data (the entry card information) from the magnetic stripe 3 of the passenger ticket 1b existing on the passenger ticket carry path 67a, is disposed midways along the passenger ticket carry path 67a. This magnetic head 61 contains (1+n/2) pieces of magnetic cores for independently reading the serial data so that (1+n/2) lines of serial data constituting the MS data can be read in parallel. These magnetic cores are disposed in a direction orthogonal to the direction of the passenger ticket carry path 67a.

A passenger ticket carrying crawler 662 for carrying the passenger ticket 1b along the passenger ticket carry path 67a is provided on the passenger ticket carry path 67a in the vicinity of the magnetic head 61. This passenger ticket carrying crawler 662 is driven by a passenger ticket carry drive motor 66.

A terminal of the passenger ticket carry path 67a is bent downward at 90 degrees. A tip of the 90-degrees bent portion of the passenger ticket carry path 67a serves as a receding path 67b on which the passenger ticket 1b temporarily recedes. A passenger ticket receding crawler 663 which makes the passenger ticket 1b advance and recede is provided on the receding path 67b. This passenger ticket receding crawler 663 is driven by the passenger ticket carry drive motor 66.

The passenger ticket 1b, when carried in a reverse direction (in a direction reverse to direction in which the passenger ticket 1b is carried toward the receding path 67b from the passenger ticket carry path 67a) by the passenger ticket receding crawler 663, enters a discharge path 67d via a connection path 67c connected rectilinearly to the receding path 67b.

On the other hand, a hopper insertion port 60 into which an entry card storage hopper 78 stored with an entry card F is inserted, is formed in a side surface opposite to the side surface formed with the passenger ticket insertion port 65 in the automatic entry card creating apparatus 41. A plurality of entry card storage hoppers 78 are prepared and each respectively stores the entry card F of any of via-countries and destination countries of the airplane F in which the automatic entry card creating apparatus 41 is installed.

The entry cards F stored in this entry card storage hopper 78 are fed out one by one by an entry card feed-out mechanism 80. More specifically, this entry card feed-out mechanism 80 has a built-in entry card feeding-out roller 691 which strongly contacts the surface of the entry card F in the entry card storage hopper 78 and which is composed of a rubber, and a built-in card feeding-out motor 69 which rotationally drives the entry card feeding-out roller 691. Hence, when the entry card feeding-out roller 691 is rotationally driven by the card feeding-out motor 69, the entry cards F are fed out one by one from the entry card storage hopper 78. The thus fed-out entry cards F are sent toward a card carry path 67e. A first entry card carrying crawler 692 driven by the card feeding-out motor 69 is provided in the vicinity of a proximal end of the card carry path 67e. Accordingly, the entry cards F fed out are carried along the card carry path 67e by the first entry card carrying crawler 692.

A printer 63 for effecting a visual print on the entry card F existing on the card carry path 67e is disposed midways of the card carry path 67e.

A second passenger ticket carrying crawler 621 for carrying the entry card F along the card carry path 67e is provided on the card carry path 67e in close proximity to the printer 63. The second passenger ticket carrying crawler 621 is driven by the card carrying motor 62.

A terminal of the card carry path 67e is bent upward at 90 degrees. A tip of the 90-degrees bent portion of the card carry path 67e is connected to a discharge path 67d together with the connection path 67c.

Card/passenger ticket carry rollers 771, 773 are respectively provided in the vicinities of the proximal end and distal end of the discharge path 67d, and a card/passenger ticket carrying crawler 772 is provided midways of the discharge path 67d. These card/passenger ticket carrying rollers 771, 773 and card/passenger ticket carrying crawler 772 are each rotationally driven by a card/passenger ticket discharging motor 77. Accordingly, the passenger ticket 1b and the entry card F, which come to the discharge path 67d, are carried along this discharge path 67d and then discharged into a card storage unit 64.

(3-2) Control Circuit

Given next is an explanation of a control circuit for controlling the print mechanism 70 described above, thereby making this print mechanism 70 read the entry card information and print the same information on the entry card F. As shown in FIG. 17, this control circuit is constructed of an MPU 71, a sensor signal detecting unit 72, an entry card information reading unit 53, an automatic language converting unit 64, a print data editing unit 54, a feed-out control unit 73, a card carry control unit 74, a passenger ticket carry control unit 75, a print control unit 55 and a discharge control unit 76, which are connected to each other via a bus B, and a memory 79 connected to the language automatic converting unit 64.

The sensor signal detecting unit 72 is connected to a ticket insertion monitoring sensor 68, and detects whether or not the passenger ticket 1b is inserted into the passenger ticket insertion port 65 on the basis of a signal transmitted from the ticket insertion monitoring sensor 68.

The entry card information reading unit 53 is connected to a magnetic head 61, and reads the MS data (the entry card information) recorded on the magnetic stripe 3 of the passenger ticket 1*b* on the basis of a signal from the magnetic head 61.

The memory 79 is stored with an entrance country language corresponding table in which every English word which might be filled in any items of the entry card information is made to correspond to a word from a plurality of language having a corresponding meaning.

The automatic language converting unit 64 converts, into character data, the MS data read by the entry card information reading unit 53, and recognizes the entry card information as English words. Then, if the official language of the entrance country is English, the language converting unit 64 transmits the character data directly to the print data editing unit 54. On the contray, if the official language of the entrance country is not English, the language converting unit 64 retrieves the words in the official language of the entrance country that correspond to the recognized English words, from the entrance country language corresponding table in the memory 79, and transmits the character data of the retrieved words to the print data editing unit 54. Note that the official language of the entrance country is specified by the crew member when he or she inserts any entry card storage hopper 78 into the hopper insertion port 60.

The print data editing unit 54 converts, into print data (dot data), the character data transmitted from the automatic language converting unit 64, and edits the data in accordance with a format of the entry card F stored in the entry card storage hopper 78.

The feed-out control unit 73 is connected to the card feeding-out motor 69 and controls this card feeding-out motor 69.

The card carry control unit 74 is connected to the card carrying motor 62 and controls this card carrying motor 62.

The passenger ticket carry control unit 75 is connected to the passenger ticket carrying motor 66 and controls this passenger ticket carrying motor 66.

The print control unit 55 is connected to the printer 63 and controls the printer 63 so that it prints the print data edited by the print data editing unit 54 on the surface of the entry card F.

Figure 18:
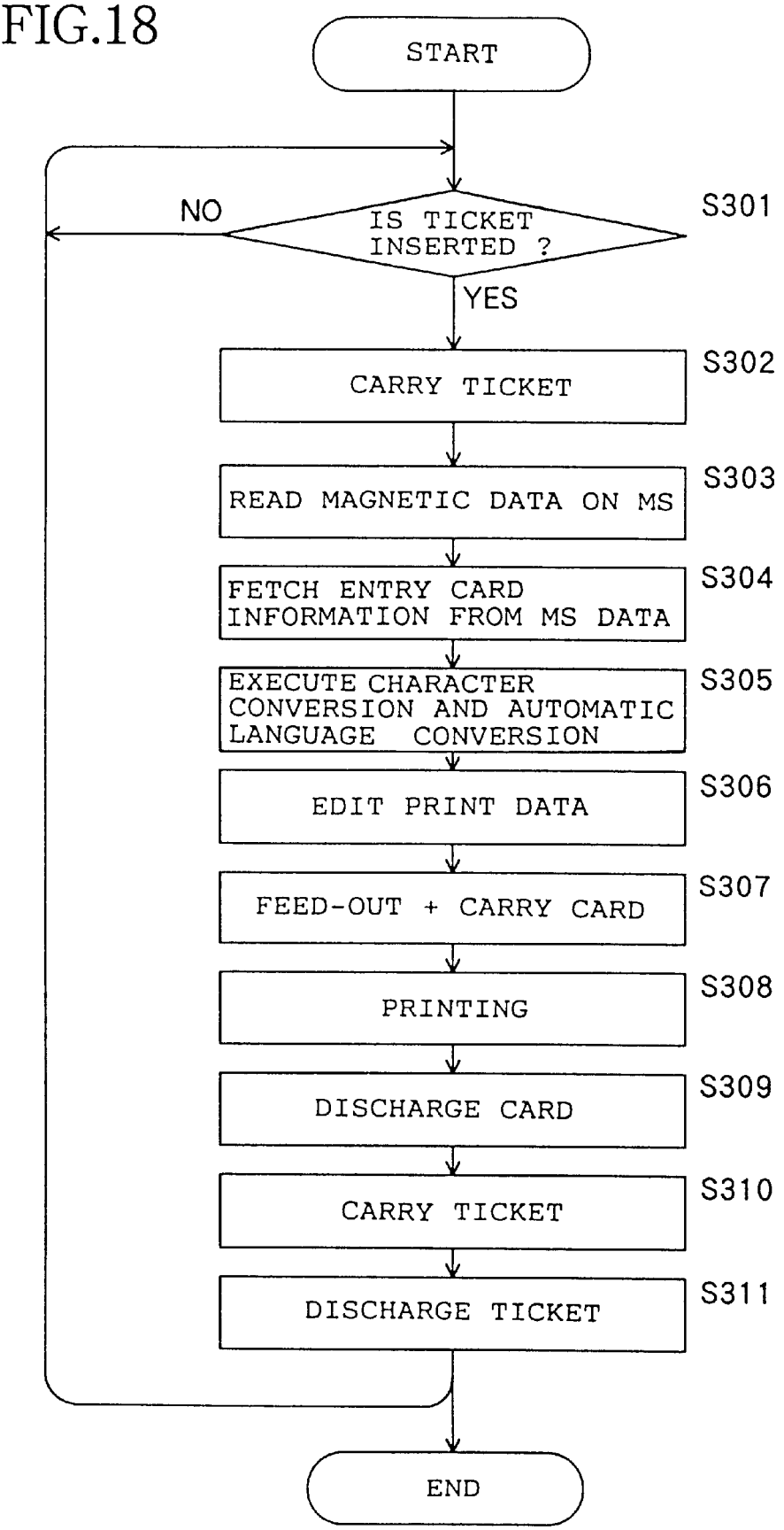
FIG. 18 is a flowchart showing a control process executed by the MPU in FIG. 17.
Figure 19:
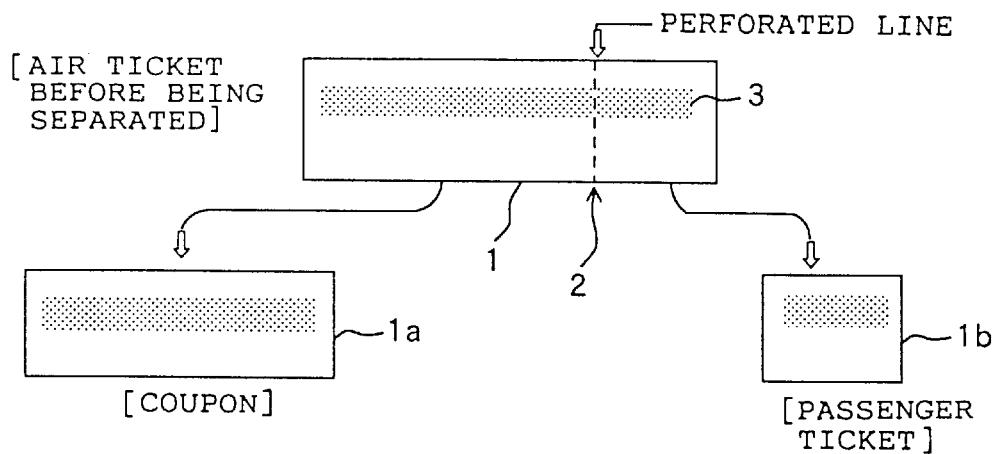
FIG. 19 is a plan view showing a conventional airline ticket.
Figure 20:
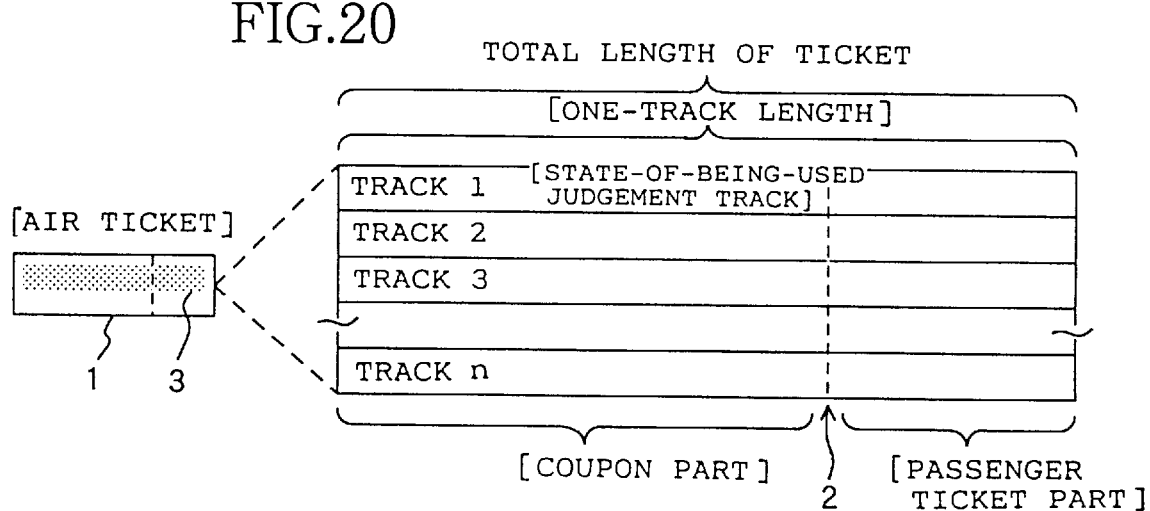
FIG. 20 is an explanatory diagram showing a format of magnetic stripe of the airline ticket shown in FIG. 19.

The MPU 71 controls the respective units in the control circuit described above so that they issue the entry card. FIG. 18 is a flowchart showing contents of the control executed by the MPU 71. In a first step S301 in the control by the MPU 71, the MPU 71 monitors whether or not the ticket insertion monitoring sensor 68 detects that the passenger ticket 1*b* is inserted into the passenger ticket insertion port 65 on the basis of a notification given from the sensor signal detecting unit 72.

Then, when the ticket insertion monitoring sensor 68 detects that the passenger ticket 1*b* is inserted into the passenger ticket insertion port 65, in the next step, S302, the MPU 71 instructs the passenger ticket carry control unit 75 to carry the passenger ticket 1*b* to the receding path 67*b*. The passenger ticket carry control unit 75 receiving this instruction controls the passenger ticket carrying motor 66, whereby the passenger ticket 1*b* inserted into the apparatus via the passenger ticket insertion port 65 is carried to the receding path 67*b*. The MPU 71, after giving this instruction, monitors that the passenger ticket 1*b* is carried to a position in which the passenger ticket 1*b* comes in contact with the magnetic head 61.

When the passenger ticket 1*b* reaches the position in which the passenger ticket 1*b* comes in contact with, the magnetic head 61, in step S303, the MPU 71 indicates the entry card information reading unit 53 to read the MS data. The entry card information reading unit 53 receiving this instruction reads the MS data recorded on the magnetic stripe 3 of the passenger ticket 1*b* by use of the magnetic head 61, and transmits the thus read MS data to the automatic language converting unit 64.

In the next step, S304, the MPU 71 instructs the automatic language converting unit 64 to take the entry card information (parallel data according to the ASCII codes) out of the MS data (the serial data).

In the next step, S305, the MPU 71 instructs the automatic language converting unit 64 to execute a conversion of the entry card information into character data and the automatic conversion. The automatic language converting unit 64 receiving this instruction converts the entry card information into the character data, and thereby recognizes the respective items of the entry card information as English words. Then, if the official language specified by the crew member is English, the automatic language converting unit 64 transmits the character data in English words directly to the print data editing unit 54. Whereas if the official language specified by the crew member is not English, the automatic language converting unit 64 retrieves the character data of the words in the official language that correspond to the English words out of the entrance country language corresponding table in the memory 79, and transmits the retrieved character data to the print data editing unit 54.

In step S306, the MPU 71 instructs the print data editing unit 54 to edit the print data. The print data editing unit 54 receiving this instruction converts the received character data into the print data, and edits the print data in conformity with the format of the entry card F stored in the entry card storage hopper 78. Then, the print data editing unit 54, upon finishing these processes, notifies the MPU 71 of an end of processing.

On receiving this notification, the MPU 71 instructs the feed-out control unit 73 to feed out the entry card F, and instructs the card carry control unit 74 to carry the entry card F in step S307. The feed-out control unit 73 receiving this instruction controls the card feeding-out motor 69, so that the entry cards F stored in the entry card storage hopper 78 are fed out one by one by the entry card feeding-out roller 691 onto the card carry path 67*e*. Further, the card carry control unit 74 receiving the above instruction controls the card carrying motor 62 to carry the entry cards F fed out by the entry card feeding-out mechanism 80 up to the discharge path 67*d*. The MPU 71, after giving those instructions, monitors that the entry card F is carried to a print position of the printer 63.

When the entry card F reaches the print position of the printer 63, in step S308, the MPU 71 instructs the print control unit 55 to start printing. At this time, the MPU 71 transmits the print data (the entry card information) edited by the print data editing unit 54 to the print control unit 55. The print control unit 55 receiving this start-of-print instruction transfers the print data to the printer 63. Thereupon, the printer 63 prints the entry card information in predetermined positions on the entry card F.

Just as the printing is completed, the entry card F has reached the discharge path 67*d*, and hence MPU 71 instructs the discharge control unit 76 to discharge the entry card F in step S309. The discharge control unit 76 receiving this instruction controls the card/passenger ticket discharging motor 77, whereby the entry cards F are carried to the card storage unit 64 and then discharged thereinto. Upon a completion of this process, the discharge control unit 67 notifies the MPU 71 of a completion of discharging the entry card.

On receiving the notification of the card being discharged, the MPU 71, in step S310, instructs the passenger ticket carry control unit 75 to carry the passenger ticket 1b in the reverse direction. The passenger ticket carry control unit 75 receiving this instruction reversely rotates the passenger ticket carrying motor 66, thereby carrying the passenger ticket 1b receding in the receding path 67b to the discharge path 67d via the connection path 67c.

When the passenger ticket 1b comes to the discharge path 67d, in step S311, the MPU 71 instructs the discharge control unit 76 to discharge the passenger ticket 1b. The discharge control unit 76 receiving this instruction controls the card/passenger ticket discharging motor 77, whereby the passenger ticket 1b is carried to the card storage unit 64 and then discharged thereinto. Upon completing this process, the discharge control unit 67 notifies the MPU 71 of the completion of the entry card being discharged. When this process is finished, the control circuit waits for an insertion of the next passenger ticket.

(4) Other Embodiments

The embodiment has been discussed so far, and the present invention can be carried out in the manners which follow.

In the embodiment discussed above, the entry card information is recorded on only the passenger ticket 1b of the airline ticket 1, but may be recorded on the coupon 1a in addition to the boarding information, without being limited to that example.

In the embodiment described above, the automatic entry card creating apparatus 41 is installed in the airplane F, but may be installed in an arbitrary location within the airport AP, e.g., in the boarding gate BG at the airport AP, without being confined to that example. In this case, the entry card F is created when it is confirmed that the passenger boards the airplane.

What is claimed is:

1. An automatic entry card creating system dealing with an airline ticket consisting of a coupon part and a passenger ticket part which are separable from each other, and on which a magnetic stripe is formed over the coupon part and the passenger ticket part, said system comprising:

an airline ticket issuing apparatus, to which entry card information composed of items of information to be written on an entry card are input, and which records all items of the input entry card information on the magnetic stripe of the passenger ticket part of the airline ticket, and issues the airline ticket; and an automatic entry card creating apparatus which reads the entry card information from the magnetic stripe of the passenger ticket part of the airline ticket issued by said airline ticket issuing apparatus, and which automatically creates an entry card based on the read entry card information.

2. An automatic entry card creating system according to claim 1, wherein said airline ticket issuing apparatus includes:

an inputting unit to input the entry card information and the boarding information; and a recording unit to record all items of the boarding information on the magnetic stripe of the coupon part of the air ticket, and to record all items of the entry card information on the magnetic stripe of the passenger ticket part.

3. An automatic entry card creating system according to claim 2, wherein said recording unit of said air ticket issuing apparatus records dummy data on an area, peripheral to a boundary line between the coupon part and the passenger ticket part, of the magnetic stripe, records the boarding information on an area, closer to the coupon part than the dummy data, of the magnetic stripe, and records the entry card information on an area, closer to the passenger ticket part than the dummy data, of the magnetic stripe.

4. An automatic entry card creating system according to claim 1, wherein said automatic entry card creating apparatus includes:

a reading unit to read the entry card information from the magnetic stripe of the passenger ticket part separated from the airline ticket;

a print data editing unit to edit print data based on the entry card information read by said reading unit; and a printing unit to print necessary items of information on the entry card based on the print data edited by said print data editing unit.

5. An air ticket issuing apparatus issuing an airline ticket consisting of a coupon part and a passenger ticket part which are separable from each other, and on which a magnetic stripe is formed over the coupon part and the passenger ticket part, said apparatus comprising:

an inputting unit to input entry card information composed of items of information to be written on an entry card, and boarding information composed of items of information for specifying a content of a reservation of the airline ticket;

a magnetic data editing unit to edit magnetic data to be recorded on the magnetic stripe based on the boarding information and the entry card information that have been input; and a magnetic data recording unit to record all items of the magnetic data of the boarding information on the magnetic stripe of the coupon part of the air ticket, and for recording all items of the magnetic data of the entry card information on the magnetic stripe of the passenger ticket part.

6. An air ticket issuing apparatus according to claim 5, wherein said magnetic date recording unit, when recording the magnetic data, records dummy data on an area, peripheral to a boundary line between the coupon part and the passenger ticket part, of the magnetic stripe, records the magnetic data of the boarding information on an area, closer to the coupon part than the dummy data, of the magnetic stripe, and records the magnetic data of the entry card information on an area, closer to the passenger ticket part than the dummy data, of the magnetic stripe.

7. An automatic entry card creating apparatus that prints necessary items of information on an entry card, comprising:

a reading unit to read entry card information composed of items of information to be written on the entry card from a magnetic stripe of a passenger ticket part of an airline ticket consisting of a coupon part and the passenger ticket part which are separable from each other, and on which the magnetic stripe is formed over the coupon part and the passenger ticket part;

a print data editing unit to edit print data on the basis of the entry card information read by said reading unit; and a printing unit to print necessary items of information on the entry card based on the print data edited by said print data editing unit.

8. An airline ticket comprising:

a coupon part;

a passenger ticket part, said coupon part and said passenger ticket part being separable from each other; and a magnetic stripe formed over the coupon part and the passenger ticket part, wherein dummy data is recorded on an area peripheral to a boundary line between the coupon part and the passenger ticket part, of the magnetic stripe, boarding information composed of items of information for specifying a content of a reservation of the airline ticket, is recorded on an area, closer to the coupon part than the dummy data, of the magnetic stripe, and entry card information composed of items of information to be written on an entry card, is recorded on an area, closer to the passenger ticket part than the dummy data, of the magnetic stripe.

* * * * *